(12) United States Patent
Seo et al.

(10) Patent No.: US 11,590,460 B2
(45) Date of Patent: Feb. 28, 2023

(54) CHEMICAL SOLUTION EVAPORATION DEVICE AND SUBSTRATE PROCESSING DEVICE INCLUDING THE SAME

(71) Applicant: SAMSUNG ELECTRONICS CO., LTD., Suwon-si (KR)

(72) Inventors: Wonguk Seo, Gunpo-si (KR); Sungyong Park, Suwon-si (KR); Hongju Kim, Seoul (KR); Ansook Sul, Hwaseong-si (KR); Seok Heo, Hwaseong-si (KR); Yinghu Xu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 17/239,644

(22) Filed: Apr. 25, 2021

(65) Prior Publication Data

US 2022/0016580 A1 Jan. 20, 2022

(30) Foreign Application Priority Data

Jul. 20, 2020 (KR) .................. 10-2020-0089861

(51) Int. Cl.
*B01F 23/10* (2022.01)
*B01F 23/231* (2022.01)
*B01F 101/56* (2022.01)

(52) U.S. Cl.
CPC .......... *B01F 23/12* (2022.01); *B01F 23/2312* (2022.01); *B01F 23/231231* (2022.01); *B01F 23/231262* (2022.01); *B01F 2101/56* (2022.01)

(58) Field of Classification Search
CPC ............................ B01F 23/12; B01F 23/2312
See application file for complete search history.

(56) References Cited

U.S. PATENT DOCUMENTS 7,680,399 B2 3/2010 Buchanan et al.
8,678,356 B2 3/2014 Iwaki et al.
(Continued)

FOREIGN PATENT DOCUMENTS

JP 2017139317 A 8/2017
JP 6301867 B2 3/2018
(Continued)

OTHER PUBLICATIONS

Bubble formation from a submerged single orifice accompanied by pressure fluctuations in gas chamber (https://www.jstage.jst.go.jp/article/jcej1968/11/3/11_3_173/_pdf).
(Continued)

*Primary Examiner* — Robert A Hopkins
(74) *Attorney, Agent, or Firm* — Volentine, Whitt & Francos, PLLC

(57) ABSTRACT

A chemical solution vaporization device includes a chemical solution tank including chemical solution vaporization rooms, a chemical solution sensing room, and a chemical solution supply room. A first internal wall separating the plurality of chemical solution vaporization rooms from each other includes a first opening at a lower portion thereof. A second internal wall separating at least one of the plurality of chemical solution vaporization rooms from the chemical solution supply room includes a second opening at a lower portion thereof. A third internal wall separating at least one of the plurality of chemical solution vaporization rooms from the chemical solution sensing room includes a third opening at a lower portion thereof. And a lower portion of a fourth internal wall separating the chemical solution sensing room from the chemical solution supply room is combined with the lower wall.

20 Claims, 20 Drawing Sheets

(56) References Cited

U.S. PATENT DOCUMENTS

| | | | |
|---|---|---|---|
| 8,724,974 B2 | 5/2014 | Ohmi et al. | |
| 8,858,710 B2 | 10/2014 | Mizunaga et al. | |
| 9,725,800 B2 | 8/2017 | Kusunoki et al. | |
| 10,651,056 B2 | 5/2020 | Tanaka et al. | |
| 10,876,207 B2 | 12/2020 | Isobe et al. | |
| 2011/0120502 A1 | 5/2011 | Anapolsky et al. | |

FOREIGN PATENT DOCUMENTS

| | | |
|---|---|---|
| JP | 6721693 B | 7/2020 |
| KR | 1020050029221 A | 3/2005 |
| KR | 200388468 | 6/2006 |
| KR | 1020080020289 | 3/2008 |
| KR | 1020090009745 | 1/2009 |
| KR | 20090015380 A * | 2/2009 |
| KR | 1020140031971 A | 3/2014 |

OTHER PUBLICATIONS

Korean Notice of Allowance dated Dec. 20, 2021 Cited in KR Patent Application No. 10-2020-0089861.
Korean Office Action dated Sep. 16, 2021 Cited in KR Patent Application No. 10-2020-0089861.

\* cited by examiner

B-B'

CHEMICAL SOLUTION EVAPORATION DEVICE AND SUBSTRATE PROCESSING DEVICE INCLUDING THE SAME

CROSS-REFERENCE TO RELATED APPLICATION

This application is based on and claims priority under 35 U.S.C. § 119 to Korean Patent Application No. 10-2020-0089861, filed on Jul. 20, 2020, in the Korean Intellectual Property Office, the disclosure of which is incorporated by reference herein in its entirety.

BACKGROUND

The disclosure relates to a chemical solution vaporization device generating a processing gas by supplying a vaporization gas to a chemical solution and treating a substrate with the generated processing gas, and a substrate processing device including the same.

Before applying a photoresist material to the substrate, to improve adhesion between the substrate and the photoresist material, a process of hydrophobization treatment may be performed on the substrate. The chemical solution vaporization device may vaporize the chemical solution to generate a processing gas, and then supply the processing gas to a plurality of reactors, and the substrate processing device in the reactors may supply the processing gas to a surface of the substrate for the hydrophobization treatment.

When the chemical solution vaporization device does not supply the processing gas having a uniform concentration to the plurality of reactors, a hydrophobization treatment state of the substrate to be processed in each of the reactors may not be uniform. Accordingly, the adhesion between the substrate and the photoresist material may be different in each of the reactors.

SUMMARY

The disclosure provides a chemical solution vaporization device capable of performing a uniform hydrophobization treatment on a substrate and a substrate processing device including the same.

The disclosure provides a chemical solution vaporization device having increased spatial utilization and a substrate processing device including the same.

The disclosure provides a chemical solution vaporization device capable of suppressing vibration of a chemical solution and precisely measuring a level of the chemical solution and a substrate processing device including the same.

According to an aspect of the disclosure, there is provided a chemical solution vaporization device that stores a chemical solution and includes a chemical solution tank, a chemical solution sensing room, and a chemical solution supply room. The chemical solution tank includes a lower wall, first through fourth internal walls, and an external wall defining a plurality of chemical solution vaporization rooms. The first internal wall separates the plurality of chemical solution vaporization rooms from each other and includes a first opening at a lower portion thereof. The second internal wall separates at least one room of the plurality of chemical solution vaporization rooms from the chemical solution supply room and includes a second opening at a lower portion thereof. The third internal wall separates at least one room of the plurality of chemical solution vaporization rooms from the chemical solution sensing room and includes a third opening at a lower portion thereof. A lower portion of the fourth internal wall separates the chemical solution sensing room from the chemical solution supply room and is combined with the lower wall. A chemical solution supply unit supplies the chemical solution to the chemical solution supply room. A bubbler supplies a vaporization gas for vaporizing the chemical solution into the chemical solution stored in the plurality of chemical solution vaporization rooms. A level sensor in the chemical solution sensing room senses a level of the chemical solution.

According to another aspect of the disclosure, there is provided a chemical solution vaporization device including a chemical solution tank having a plurality of chemical solution vaporization rooms, a chemical solution sensing room, and a chemical solution supply room. A chemical solution supply unit supplies a chemical solution to the chemical solution supply room. A bubbler supplies a vaporization gas into the chemical solution stored in the plurality of chemical solution vaporization rooms. The bubbler includes a vaporization gas injector providing a path in which the vaporization gas moves. A vaporization gas discharger includes a vaporization gas discharge group having a plurality of vaporization gas discharge holes in a radial shape at a constant distance from a center portion of the vaporization gas injector on an upper surface thereof. A vaporization gas discharger discharges the vaporization gas into the chemical solution. A level sensor in the chemical solution sensing room senses a level of the chemical solution.

According to another aspect of the disclosure, there is provided a substrate processing device including a spin chuck configured to rotate a substrate. A chemical solution vaporization device generates a processing gas by vaporizing a chemical solution. The chemical solution vaporization device includes a chemical solution tank, a chemical solution sensing room, and a chemical solution supply room. The chemical solution tank has a lower wall, first through fourth internal walls, and an external wall defining a plurality of chemical solution vaporization rooms. The first internal wall separates the plurality of chemical solution vaporization rooms from each other and includes a first opening at a lower portion thereof. The second internal wall separates at least one room of the plurality of chemical solution vaporization rooms from the chemical solution supply room and includes a second opening at a lower portion thereof. The third internal wall separates at least one room of the plurality of chemical solution vaporization rooms from the chemical solution sensing room and includes a third opening at a lower portion thereof. A lower portion of the fourth internal wall separates the chemical solution sensing room from the chemical solution supply room and is coupled with the lower wall. A chemical solution supply unit supplies the chemical solution to the chemical solution supply room. A bubbler supplies a vaporization gas for vaporizing the chemical solution into the chemical solution stored in the plurality of chemical solution vaporization rooms. A level sensor is disposed in the chemical solution sensing room to sense a level of the chemical solution. A processing gas coating device applies the processing gas delivered from the chemical solution vaporization device onto the substrate.

A plurality of chemical solution vaporization rooms of a chemical solution vaporization device according to the disclosure may have substantially the same dimensions, and levels of the chemical solution in the plurality of chemical solution vaporization rooms may be substantially the same as each other. Accordingly, the chemical solution vaporization device may generate a processing gas having a uniform concentration and supply the processing gas to a plurality of reactors and a substrate processed in the plurality of reactors may be uniformly hydrophobized.

In addition, an external appearance of the chemical solution vaporization device according to an example embodiment of the disclosure may be in a shape corresponding to a shape of a housing in which the chemical solution vaporization device is accommodated. Accordingly, the spatial utilization of the chemical solution vaporization device may be increased.

In addition, a chemical solution tank of the chemical solution vaporization device according to an example embodiment of the disclosure may include an internal wall which blocks a flow of the chemical solution between a chemical solution supply room and a chemical solution sensing room. Accordingly, the transfer of vibration of the chemical solution generated by the supply of the chemical solution in a chemical solution supply room to the chemical solution sensing room may be reduced, and a level sensor in the chemical solution sensing room may accurately measure the level of the chemical solution.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

Hereinafter, example embodiments of the disclosure will be described in detail with reference to the accompanying drawings.

Figure 1:
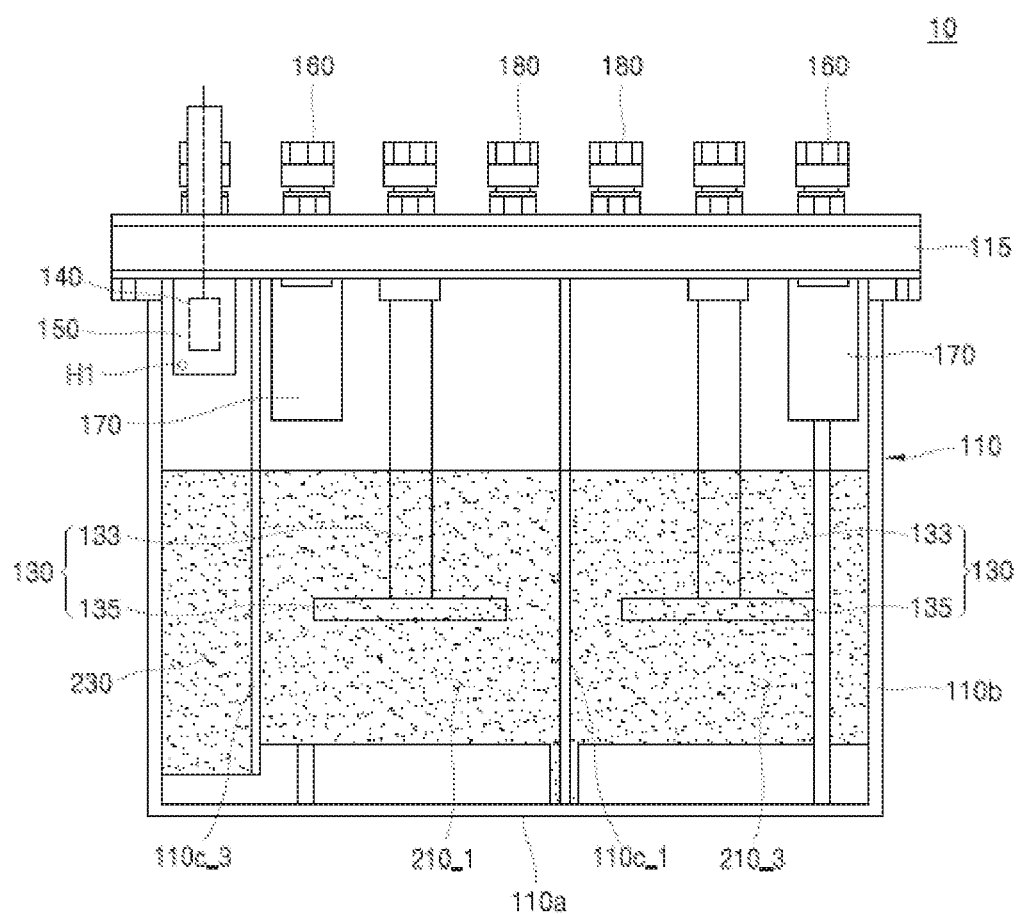
FIG. 1 is a side view of a chemical solution vaporization device according to an example embodiment of the disclosure.
Figure 2:
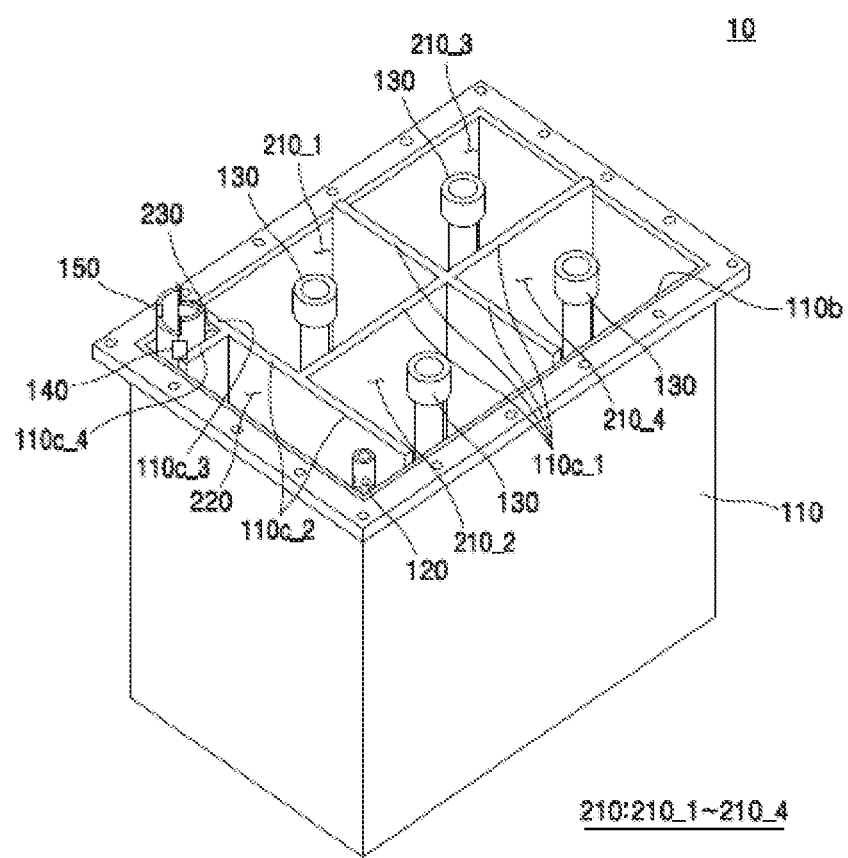
FIG. 2 is a perspective view of a chemical solution vaporization device according to an example embodiment of the disclosure.

FIG. 1 is a side view of a chemical solution vaporization device 10 according to an example embodiment of the disclosure, and FIG. 2 is a perspective view of a portion of the chemical solution vaporization device 10, according to an example embodiment of the disclosure.

The chemical solution vaporization device 10 according to an example embodiment of the disclosure may include a device configured to supply a vaporization gas to a chemical solution to generate a process gas, and to supply the generated process gas to a plurality of reactors.

In an example embodiment, the processing gas generated by the chemical solution vaporization device 10 may be a gas that hydrophobizes a surface of a substrate to increase adhesion between a photoresist material and the substrate in a photoresist process. For example, the processing gas may include hexamethyldisilazane (HMDS) in a gaseous state.

Referring to FIGS. 1 and 2 together, the chemical solution vaporization device 10 according to an example embodiment of the disclosure may include a chemical solution tank 110, a tank cover 115, a chemical solution supply unit 120, a bubbler 130, a level sensor 140, a sensor input tube 150, a processing gas valve 160, a chemical solution shield tube 170, a maintenance valve 180, or the like.

The chemical solution tank 110 may provide an internal space for storing the chemical solution. The chemical solution tank 110 may include a lower wall 110a, an external wall 110b extending in a vertical direction from the lower wall 110a and defining an external appearance of the chemical solution tank 110, and first through fourth internal walls 110c_1 through 110c_4 dividing an internal space of the chemical solution tank 110 into a plurality of spaces. Hereinafter, one or more of the first through fourth internal walls 110c_1 through 110c_4 may be referred to as an internal wall 110c.

In an example embodiment, the external appearance of the chemical solution tank 110 may be a cuboid shape. For example, the external wall 110b of the chemical solution tank 110 may include four walls extending in a vertical direction from the lower wall 110a, and one external wall 110b may be orthogonal to two adjacent external walls 110b.

In an example embodiment, an internal wall 110c of the chemical solution tank 110 may include the first through fourth internal walls 110c_1 through 110c_4, and the first through fourth internal walls 110c_1 through 110c_4 may divide the internal space of the chemical solution tank 110 into a plurality of spaces.

For example, the first through fourth internal walls 110c_1 through 110c_4 may divide the internal space of the chemical solution tank 110 into first through fourth chemical solution vaporization rooms 210_1 through 210_4, a chemical solution supply room 220, and a chemical solution sensing room 230.

The first through fourth chemical solution vaporization rooms 210_1 through 210_4 may be spaces defined by the first internal wall 110c_1, the second internal wall 110c_2, the third internal wall 110c_3, and the external wall 110b. In addition, the first through fourth chemical solution vaporization rooms 210_1 through 210_4 may accommodate the vaporization gas supplied by the bubbler 130 and may be spaces in which the chemical solution is vaporized by the vaporization gas and a processing gas is generated. The first internal wall 110c_1 may include a wall separating the first through fourth chemical solution vaporization rooms 210_1 through 210_4 from each other.

In addition, the chemical solution supply room 220 may be a space defined by the second internal wall 110c_2, the fourth internal wall 110c_4, and the external wall 110b and may be a space to which the chemical solution supply unit 120 supplies the chemical solution. The second internal wall 110c_2 may include a wall separating the first and second chemical solution vaporization rooms 210_1 and 210_2 from the chemical solution supply room 220, and the fourth internal wall 110c_may include a wall separating the chemical solution supply room 220 from the chemical solution sensing room 230.

In addition, the chemical solution sensing room 230 may include a space defined by the third internal wall 110c_3, the fourth internal wall 110c_4, and the external wall 110b and may include a space in which the level sensor 140 measures a level of the chemical solution. The third internal wall 110c_3 may include a wall separating the first chemical solution vaporization room 210_1 from the chemical solution sensing room 230.

In an example embodiment, the first internal wall 110c_1 may include a first opening (O1 in FIG. 4A) at the bottom thereof that permits a flow of the chemical solution between the first through fourth chemical solution vaporization rooms 210_1 through 210_4. The first opening O1 may include a gap between the first internal wall 110_c1 and the lower wall 110a.

The second internal wall 110c_2 may include a second opening (O2 in FIG. 4A) at a bottom thereof that permits a flow of the chemical solution between the first chemical solution vaporization room 210_1 and the chemical solution supply room 220 and a flow of the chemical solution between the second chemical solution vaporization room 210_2 and the chemical solution supply room 220. The second opening O2 may include a gap between the second internal wall 110c_2 and the lower wall 110a.

In addition, the third internal wall 110c_3 may include a third opening (O3 in FIG. 4B) at a bottom thereof that permits a flow of the chemical solution between the first chemical solution vaporization room 210_1 and the chemical solution sensing room 230. The third opening O3 may include a gap between the third internal wall 110_c3 and the lower wall 110a. Hereinafter, one or more of the first through fourth chemical solution vaporization rooms 210_1 through 210_4 may be referred to as a chemical solution vaporization room 210.

Accordingly, levels formed by the chemical solution in the first through fourth chemical solution vaporization rooms 210_1 through 210_4, the chemical solution supply room 220, and the chemical solution sensing room 230 included in the chemical solution tank 110 may be substantially the same. The level of the chemical solution may be defined as a height formed by the chemical solution in the chemical solution tank 110 in a vertical direction from the lower wall 110a.

In an example embodiment, the fourth internal wall 110c_4 may block the flow of the chemical solution between the chemical solution supply room 220 and the chemical solution sensing room 230. For example, a lower portion of the fourth internal wall 110c_4 may be coupled with the lower wall 110a, and may not have an opening.

Accordingly, the chemical solution provided by the chemical solution supply unit 120 to the chemical solution supply room 220 may not flow directly from the chemical solution supply room 220 to the chemical solution sensing room 230 due to the fourth internal wall 110c_4, and the intensity of vibration of the chemical solution in the chemical solution sensing room 230 may be reduced.

The technical idea of the chemical solution tank 110 will be described in more detail with reference to FIGS. 3 and 4A through 4C.

The tank cover 115 may include a cover covering an upper portion of the chemical solution tank 110. The tank cover 115 may cover upper portions of the first through fourth chemical solution vaporization rooms 210_1 through 210_4, the chemical solution supply room 220, and the chemical solution sensing room 230 of the chemical solution tank 110. The chemical solution supply device 120, the bubbler 130, the level sensor 140, the sensor input tube 150, the process gas valve 160, the chemical solution shield tube 170, and the maintenance valve 180, or the like may be coupled with the tank cover 115.

The chemical solution supply unit 120 may include a device configured to supply the chemical solution to the chemical solution supply room 220 of the chemical solution tank 110. For example, the chemical solution supplied by the chemical solution supply unit 120 to the chemical solution tank 110 may include HMDS in a liquid state.

When the chemical solution supply unit 120 sprays the chemical solution in a direction perpendicular to the chemical solution supply room 220 (for example, a direction perpendicular to a surface of the chemical solution in the chemical solution supply room 220), the sprayed chemical solution may splash from a surface of the chemical solution stored in the chemical solution supply room 220, and may cause vibration of the chemical solution stored in the chemical solution supply room 220.

The chemical solution supply unit 120 according to an example embodiment of the disclosure may have a plurality of chemical solution discharge holes (H2 in FIG. 6) having different heights from each other, and may spray the chemical solution in a horizontal direction (for example, a direction horizontal to the surface of the chemical solution in the chemical solution supply room 220) via the plurality of chemical solution discharge holes H2. Accordingly, the chemical solution supply unit 120 may reduce splashing and vibration of the chemical solution.

The technical idea of the chemical solution supply unit 120 will be described in more detail with reference to FIGS. 6 and 7.

The bubbler 130 may be in the chemical solution vaporization room 210 of the chemical solution tank 110 and may include a device that supplies the vaporization gas to the chemical solution stored in the chemical solution vaporization room 210. For example, a portion of the bubbler 130 may be immersed in the chemical solution in the chemical solution vaporization room 210, and the vaporization gas may be supplied to the chemical solution in a form of bubble.

In an example embodiment, the vaporization gas supplied by the bubbler 130 may include gaseous nitrogen ($N_2$). When the nitrogen, which is the vaporization gas, is supplied to the HMDS solution stored in the chemical solution vaporization room 210 by the bubbler 130, the HMDS in the liquid state may go through a phase change into a gaseous HMDS. The gaseous HMDS may include a processing gas for hydrophobizing the substrate in a substrate processing process.

In an example embodiment, the bubbler 130 may include a vaporization gas injector 133 and a vaporization gas discharger 135. The vaporization gas injector 133 may include a flow path through which the vaporization gas moves to the vaporization gas discharger 135. For example, the vaporization gas injector 133 may include a cylinder-shaped flow path through which the vaporization gas moves.

In an example embodiment, the vaporization gas discharger 135 may be connected to a lower portion of the vaporization gas injector 133, and may supply the vaporization gas to the chemical solution stored in the chemical solution vaporization room 210. To supply the vaporization gas to the chemical solution, the vaporization gas discharger 135 may be immersed in the chemical solution stored in the chemical solution vaporization room 210.

In an example embodiment, the cross-section area of the vaporization gas discharger 135 may be greater than that of the vaporization gas injector 133. For example, the vaporization gas injector 133 may have a cylindrical shape that has a cross-section area that is greater than that of the vaporization gas injector 133.

In an example embodiment, the vaporization gas discharger 135 may include a plurality of vaporization gas discharge holes (H3 in FIG. 8) in an upper surface thereof. The vaporization gas discharge holes H3 may be holes for discharging the vaporization gas to the chemical solution, and may be connected to the vaporization gas injector 133.

Because the vaporization gas discharger 135 includes the vaporization gas discharge holes H3 in the upper surface thereof, the vaporization gas discharger 135 may discharge the vaporization gas in a direction opposite to a direction of gravity. The vaporization gas discharged from the vaporization gas discharger 135 may form bubbles, and the chemical solution in a liquid state may go through the phase change into the chemical solution in a gas state.

The technical idea of the vaporization gas discharger 135 will be described in more detail with reference to FIGS. 8 through 14.

The level sensor 140 may include a sensor that is in the chemical solution sensing room 230 of the chemical solution tank 110 and measure the level of the chemical solution in the chemical solution sensing room 230. In other words, the level sensor 140 may include a sensor measuring a height that is formed in a vertical direction from the lower wall of the chemical solution tank 110 by the chemical solution in the chemical solution sensing room 230.

In an example embodiment, the level sensor 140 may be apart from the surface of the chemical solution in the chemical solution sensing room 230 in a vertical direction. The level sensor 140 may include a sensor that measures the level of the chemical solution without direct contact with the chemical solution in the chemical solution sensing room 230.

The technical idea of the level sensor 140 will be described in more detail with reference to FIG. 15.

The sensor input tube 150 may be coupled to the tank cover 115 and may provide a path via which the level sensor 140 moves. In addition, the sensor input tube 150 may surround the level sensor 140. Because the sensor input tube 150 may surround the level sensor 140, contamination of the level sensor 140 due to splashing of the chemical solution may be prevented.

Figure 16:
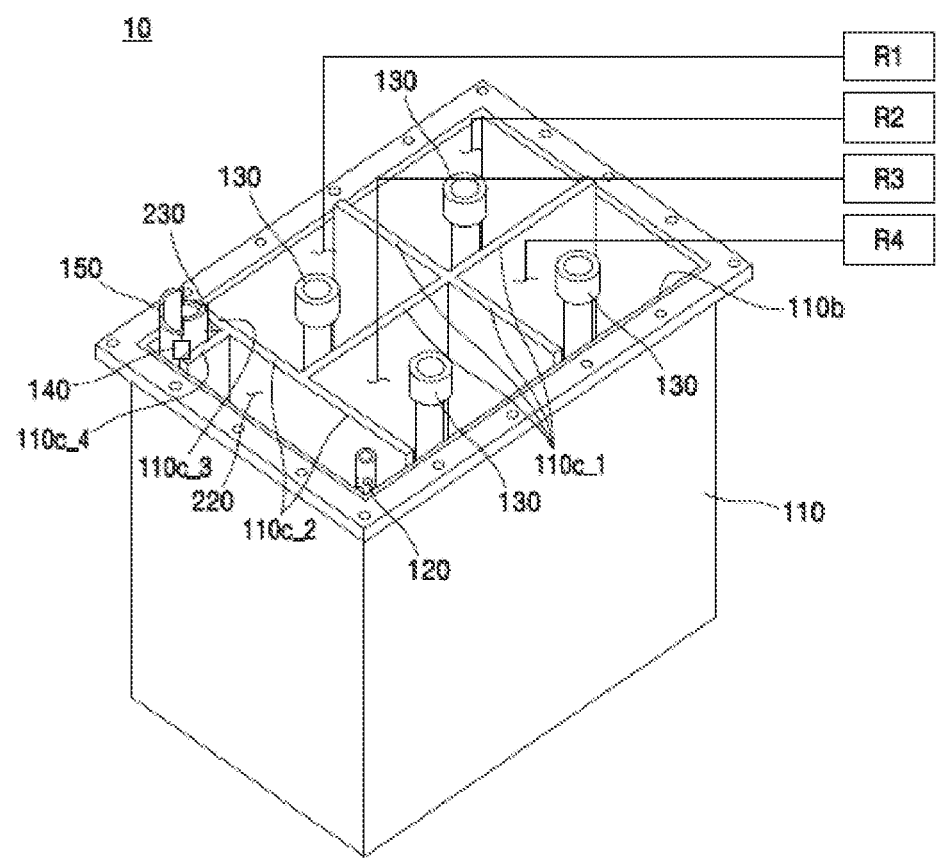
FIGS. 16 and 17 are diagrams of a substrate processing device comprising a chemical solution vaporization device according to example embodiments of the disclosure.

The process gas valve 160 may include a valve transferring the process gas generated in the chemical solution vaporization room 210 to first through fourth reactors R1 through R4 (in FIG. 16). For example, the gaseous HMDS generated in the chemical solution vaporization room 210 may be transferred to the first through fourth reactors R1 through R4 via the process gas valve 160.

The chemical solution shield tube 170 may be coupled with the tank cover 115 to overlap the processing gas valve 160 in a vertical direction. In addition, the chemical solution shield tube 170 may surround a portion of the processing gas valve 160. Because the chemical solution shield tube 170 surrounds a portion of the processing gas valve 160, discharging of the chemical solution in a liquid state via the processing gas valve 160 may be suppressed.

In an example embodiment, the chemical solution shield tube 170 may have a hole H1 in the lower portion thereof. The chemical solution that has splashed from the surface of the chemical solution vaporization room 210 and moved into the chemical solution shield tube 170 may be discharged to the chemical solution vaporization room 210 via the hole H1.

The maintenance valve 180 may include a valve for maintenance of the chemical solution vaporization room 210. For example, the maintenance valve 180 may include a valve for adjusting pressure inside the chemical solution vaporization room 210.

Figure 3:
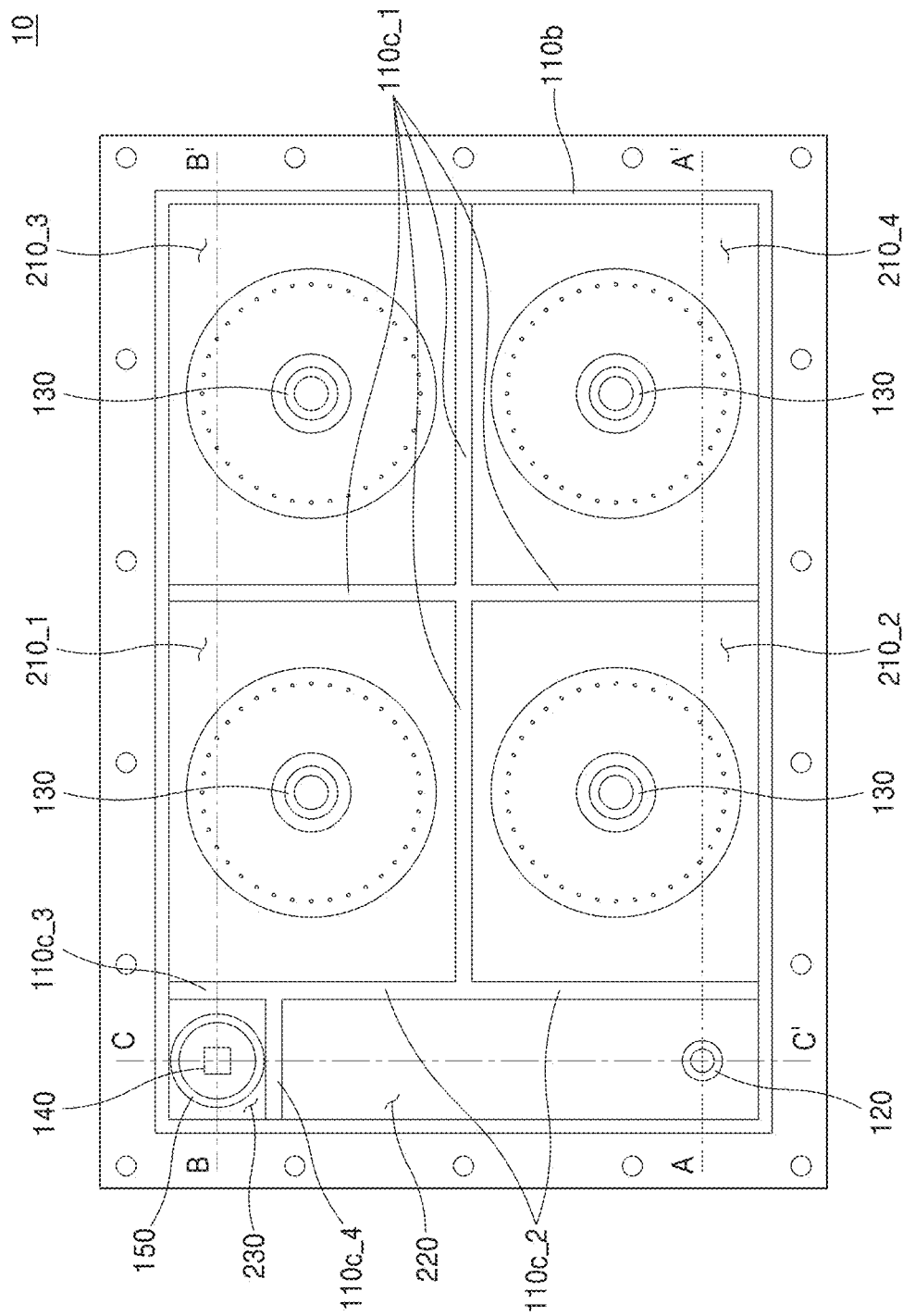
FIG. 3 is a plan view of a chemical solution vaporization device according to an example embodiment of the disclosure.
Figure 4A:
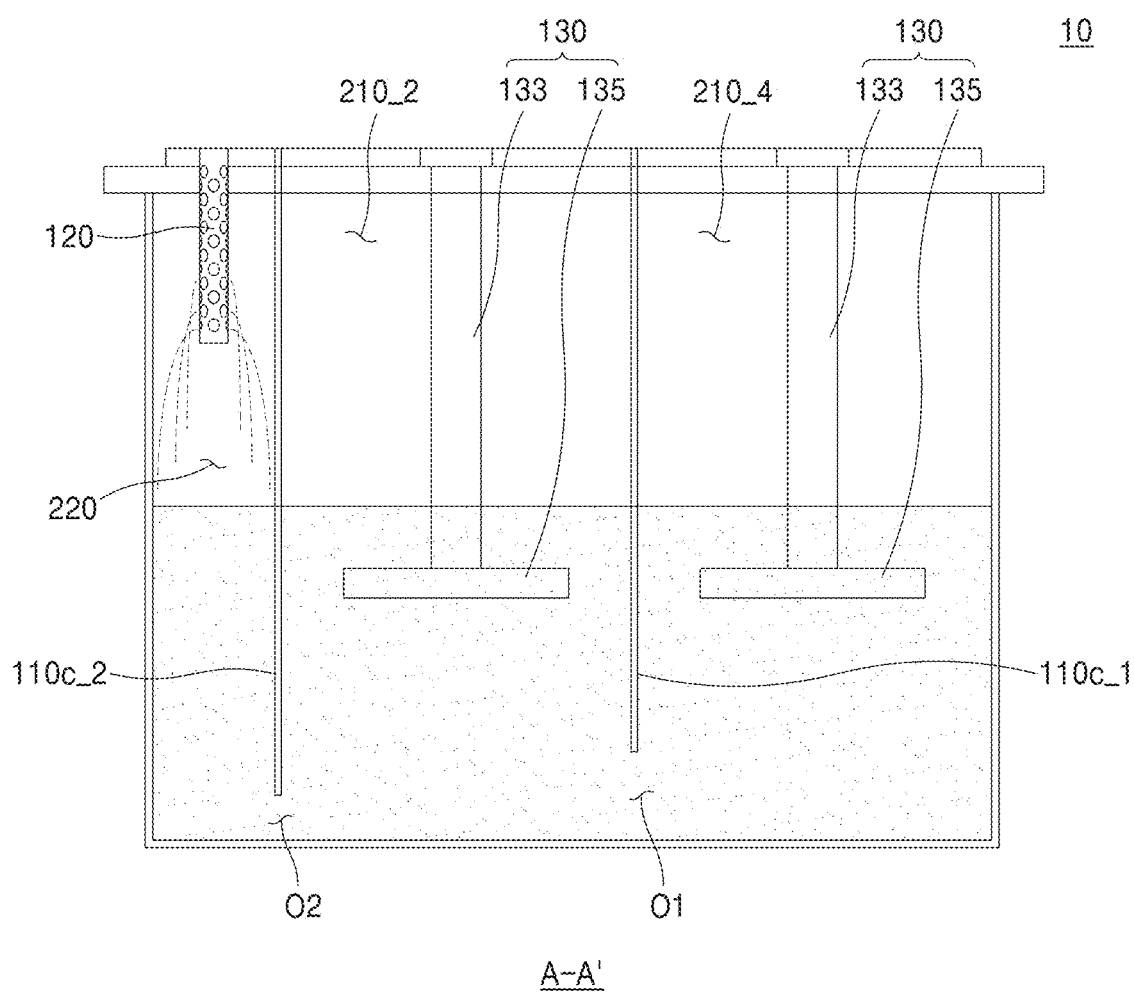
FIG. 4A is a cross-sectional view taken along line A-A' in FIG. 3.
Figure 4B:
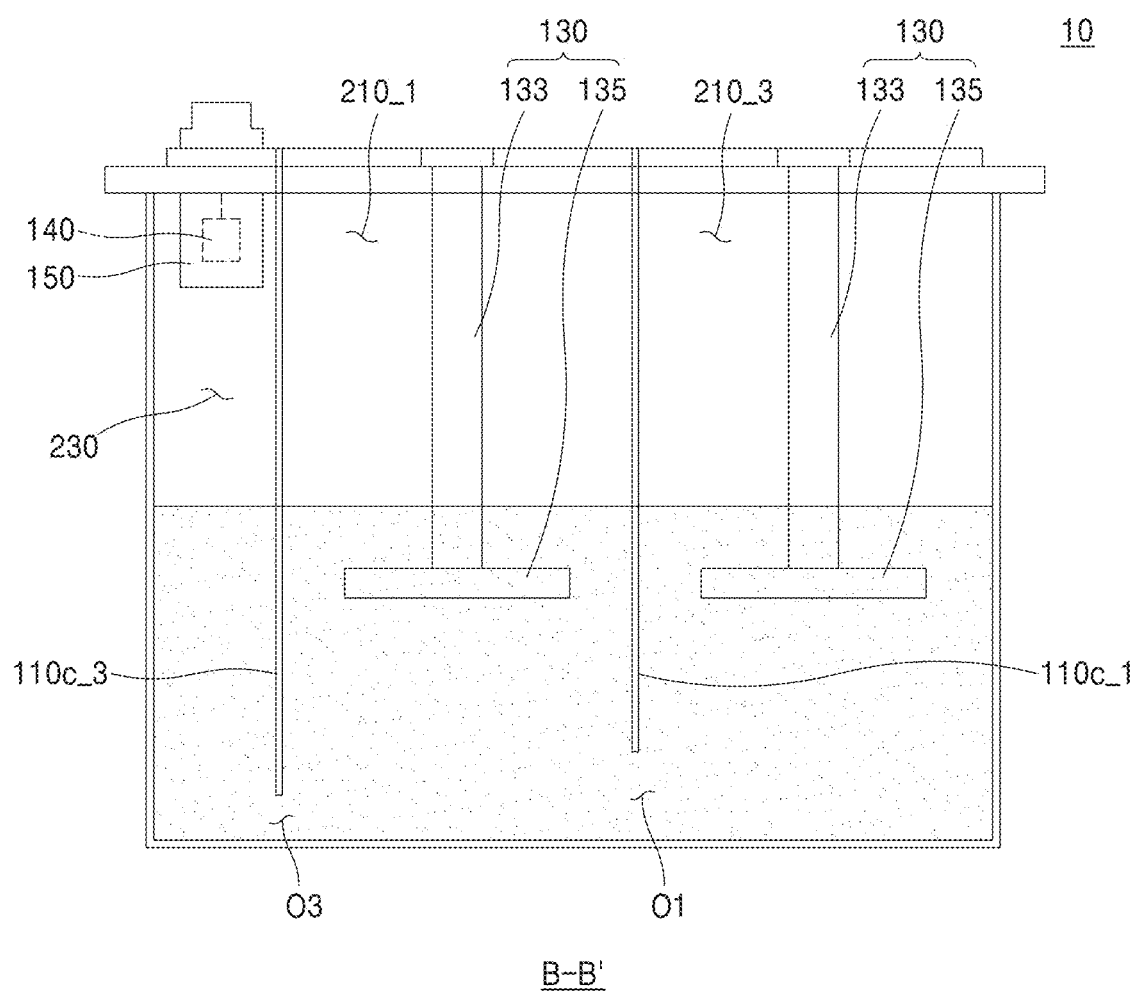
FIG. 4B is a cross-sectional view taken along line B-B' in FIG. 3.
Figure 4C:
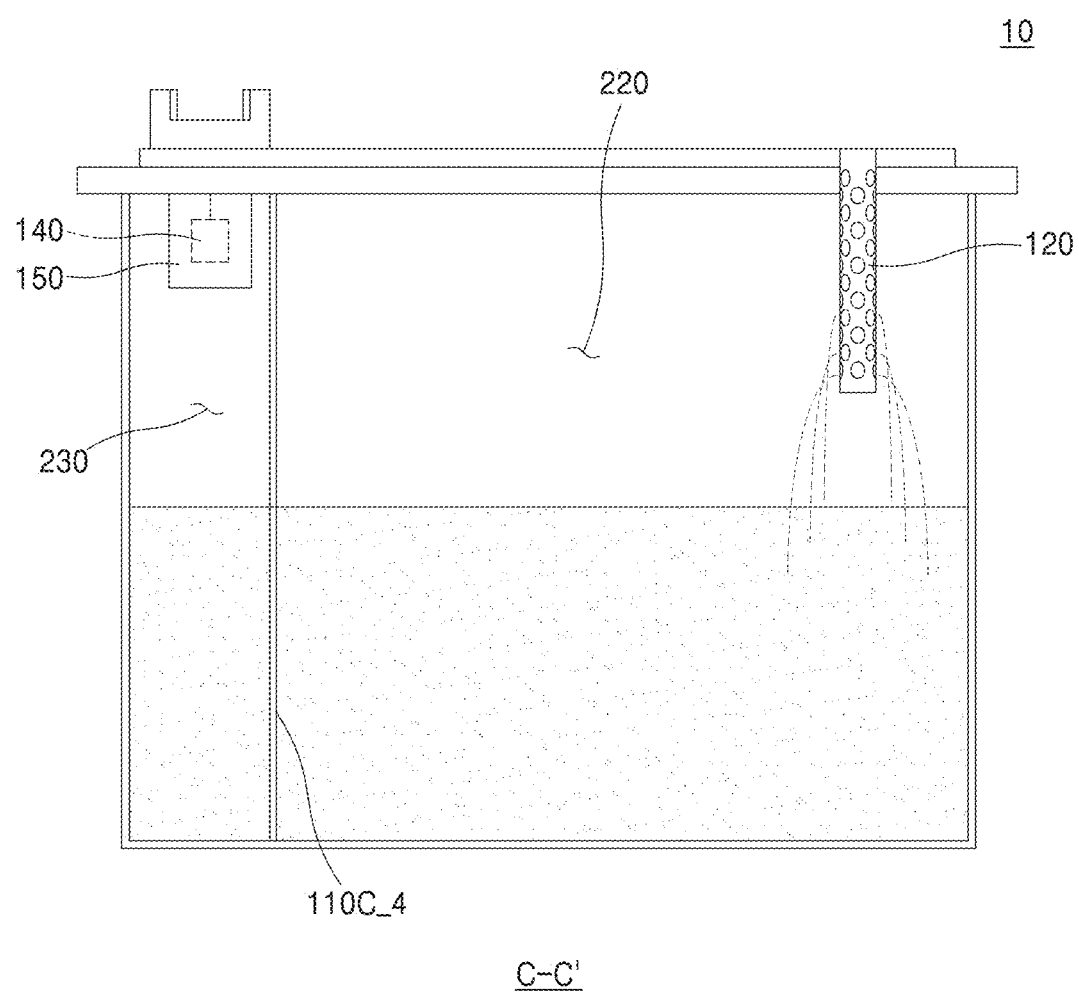
FIG. 4C is a cross-sectional view taken along line C-C' in FIG. 3.

FIG. 3 is a plan view of the chemical solution vaporization device chemical solution vaporization device 10 according to an example embodiment of the disclosure. In addition, FIG. 4A is a cross-sectional view taken along line A-A' in FIG. 3, FIG. 4B is a cross-sectional view taken along line B-B' in FIG. 3, and FIG. 4C is a cross-sectional view taken along line C-C' in FIG. 3.

Referring to FIG. 3, the chemical solution tank 110 may include the external wall 110b and the first through fourth internal walls 110c_1 through 110c_4, which separate the first through fourth chemical solution vaporization rooms 210_1 through 210_4 from the chemical solution sensing room 230.

In FIG. 3, the first through third internal walls 110c_1 through 110c_3 are illustrated by double solid lines. The first through third internal walls 110c_1 through 110c_3 may have a structure that allows the flow of the chemical solution between rooms including any one of the first through third internal walls 110c_1 through 110c_3 therebetween.

In an example embodiment, the first through third internal walls 110c_1 and 110c_3 may have first through third openings O1 through O3 at the lower side thereof, respectively, and the first through third openings O1 through O3 may include gaps between the first through third internal walls 110c_1 through 110c_3 and the lower wall 110a, respectively.

Due to the above-described structure of the first through third internal walls 110c_1 through 110c_3, the level of the chemical solution stored in the first through fourth chemical solution vaporization rooms 210_1 through 210_4, the chemical solution supply room 220, and the chemical solution sensing room 230 may be substantially the same.

In addition, dimensions of the first through fourth chemical solution vaporization rooms 210_1 through 210_4 may be substantially the same. For example, shapes and volumes of the first through fourth chemical solution vaporization rooms 210_1 through 210_4 may be substantially the same. Accordingly, an amount of the chemical solution (for example, the volume of the chemical solution) stored in the first through fourth chemical solution vaporization rooms 210_1 through 210_4 may be substantially the same.

As described above, because the dimensions of the first through fourth chemical solution vaporization rooms 210_1 through 210_4 are substantially the same and the levels of the chemical solution stored in the first through fourth chemical solution vaporization rooms 210_1 through 210_4 are substantially the same, concentration of the processing gas generated in the first through fourth chemical solution vaporization rooms 210_1 through 210_4 may be the same.

In FIG. 3, the fourth internal wall 110c_4 is shown by a double solid line. The fourth internal wall 110c_4 may have a structure that blocks the flow of the chemical solution between the chemical solution supply room 220 and the chemical solution sensing room 230 including the fourth internal wall 110c_4 therebetween. For example, the lower portion of the fourth internal wall 110c_4 may be integrally combined with the lower wall 110a.

Because the fourth internal wall 110c_4 blocks the flow of the chemical solution between the chemical solution supply room 220 and the chemical solution sensing room 230, the level sensor 140 in the chemical solution sensing room 230 may accurately measure the level of the chemical solution.

Referring to FIGS. 3 and 4A together, the first internal wall 110c_1 may be apart from the lower wall 110a in a vertical direction to permit the flow of the chemical solution between the second chemical solution vaporization room 210_2 and the fourth chemical solution vaporization room 210_4. In addition, the second internal wall 110c_2 may be apart from the lower wall 110a in a vertical direction to permit the flow of the chemical solution between the chemical solution supply room 220 and the second chemical solution vaporization room 210_2.

To generate the processing gas of a uniform concentration in the first through fourth chemical solution vaporization rooms 210_1 through 210_4, it may be important to increase the flow of the chemical solution between the first through fourth chemical solution vaporization rooms 210_1 through 210_4.

At the same time, it may also be important to reduce the transfer of vibration of the chemical solution in the chemical solution supply room 220 generated by the supply of the chemical solution from the chemical solution supply unit 120 to the first through fourth chemical solution vaporization rooms 210_1 through 210_4.

Accordingly, a separation distance in a vertical direction between the first internal wall 110c_1 and the lower wall 110a of the chemical solution tank 110 according to an example embodiment of the disclosure may be greater than that between the second internal wall 110c_2 and the lower wall 110a.

Referring to FIGS. 3 and 4B together, the first internal wall 110c_1 may be apart from the lower wall 110a in a vertical direction to permit the flow of the chemical solution between the first chemical solution vaporization room 210_1 and the third chemical solution vaporization room 210_3. In addition, the third internal wall 110c_3 may be apart from the lower wall 110a in a vertical direction to permit the flow of the chemical solution between the chemical solution sensing room 230 and the first chemical solution vaporization room 210_1.

To generate the processing gas of a uniform concentration in the first through fourth chemical solution vaporization rooms 210_1 through 210_4, it may be important to increase the flow of the chemical solution between the first through fourth chemical solution vaporization rooms 210_1 through 210_4.

At the same time, for the level sensor 140 to accurately measure the level of the chemical solution in the chemical solution sensing room 230, it may be important to reduce the transfer of vibration of the chemical solution generated in the first through fourth chemical solution vaporization rooms 210_1 through 210_4 to the chemical solution sensing room 230.

Accordingly, a separation distance in a vertical direction between the first internal wall 110c_1 and the lower wall 110a of the chemical solution tank 110 according to an example embodiment of the disclosure may be greater than that between the third internal wall 110c_3 and the lower wall 110a.

When referring to FIGS. 3 and 4C together, the fourth internal wall 110c_4 may contact the lower wall 110a to block the flow of the chemical solution between the chemical solution supply room 220 and the chemical solution sensing room 230. For example, the fourth internal wall 110c_4 may be integrally combined with the lower wall 110a.

Accordingly, the transfer of vibration of the chemical solution generated in the chemical solution supply room 220 by the supply of the chemical solution from the chemical solution supply unit 120 to the chemical solution sensing room 230 may be reduced. Accordingly, the level sensor 140 in the chemical solution sensing room 230 may accurately measure the level of the chemical solution.

Figure 5:
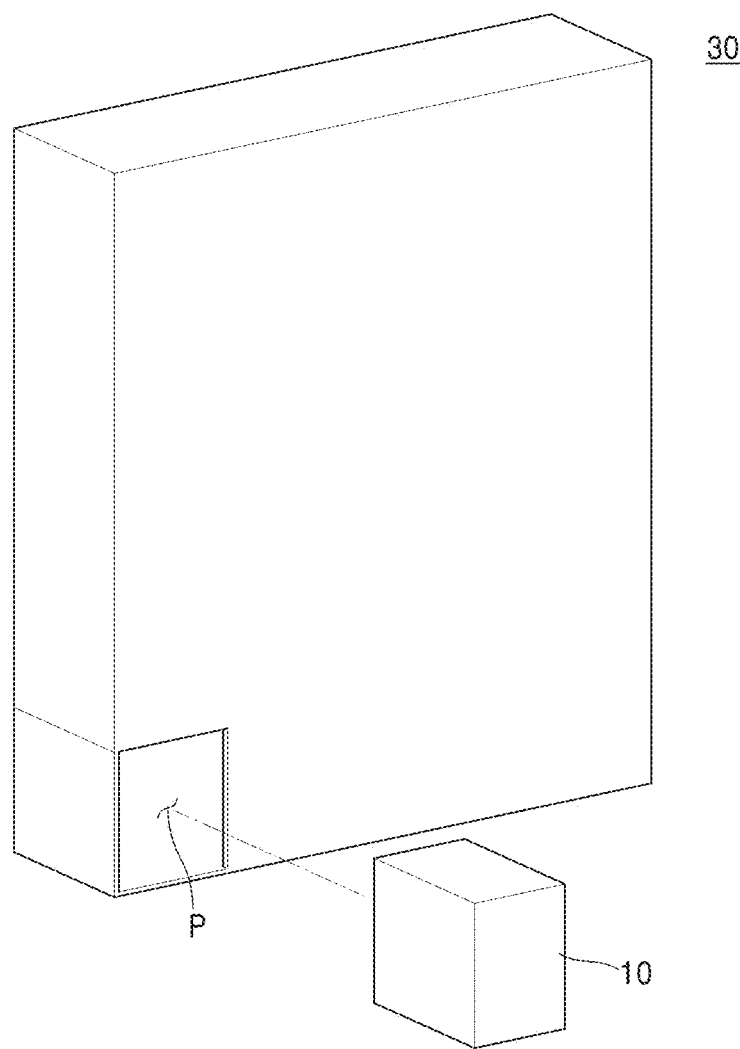
FIG. 5 is a diagram of a housing that accommodates a chemical solution vaporizing device, according to an example embodiment of the disclosure.

FIG. 5 is a diagram of a housing 30 that accommodates the chemical solution vaporization device 10, according to an example embodiment of the disclosure.

In an example embodiment, an external appearance of the housing 30 may be a cuboid shape. In addition, the housing 30 may have a first space P in which the chemical solution vaporization device 10 is accommodated. Because the external appearance of the housing 30 is provided in the cuboid shape, the first space P may also be provided in the cuboid shape.

When the external appearance of the chemical solution vaporization device 10 according to a comparative example is provided in a cylindrical shape, spatial utilization of the chemical solution vaporization device 10 in the first space P of the housing 30 may be low. In other words, in the first space P of the housing 30, the volume occupied by the chemical solution vaporization device 10 may be small. When the volume occupied by the chemical solution vaporization device 10 is small, the amount of processing gas generated by the chemical solution vaporization device 10 may be reduced.

The external appearance of the chemical liquid chemical solution vaporization device 10 according to an example embodiment of the disclosure may be provided in a shape corresponding to the first space P of the housing 30. For example, when the first space P of the housing 30 has the cuboid shape, the external appearance of the chemical solution vaporization device 10 may also be provided in the cuboid shape. Accordingly, the spatial utilization of the chemical solution vaporization device 10 in the first space P of the housing 30 may be increased and the amount of processing gas generated in the chemical solution vaporization device 10 may be increased.

The chemical solution vaporization apparatus 10 according to an example embodiment of the disclosure may include the first through fourth chemical solution vaporization rooms 210_1 through 210_4 having substantially the same dimensions. In addition, due to the structure of the chemical solution tank 110 described above, the levels of the chemical solution stored in the first through fourth chemical solution vaporization rooms 210_1 through 210_4 may be substantially the same.

Accordingly, the concentration of the processing gas generated in each of the first through fourth chemical solution vaporization rooms 210_1 through 210_4 may be substantially the same and the process gas may uniformly hydrophobize the substrate in the first through fourth reactors R1 through R4 (in FIG. 16) respectively connected to the first through fourth chemical solution vaporization rooms 210_1 through 210_4.

In addition, because the chemical solution tank 110 of the chemical solution vaporization device 10 according to an example embodiment of the disclosure includes the fourth internal wall 110c_4 blocking the flow of the chemical solution between the chemical solution supply room 220 and the chemical solution sensing room 230, the level sensor 140 in the chemical solution sensing room 230 may accurately measure the level of the chemical solution.

In addition, because the external appearance of the chemical solution vaporization device 10 according to an example embodiment of the disclosure corresponds to the shape of the first space P of the housing 30 in which the chemical solution vaporization device 10 is accommodated, the spatial utilization of the chemical solution vaporization device 10 may be increased.

Figure 6:
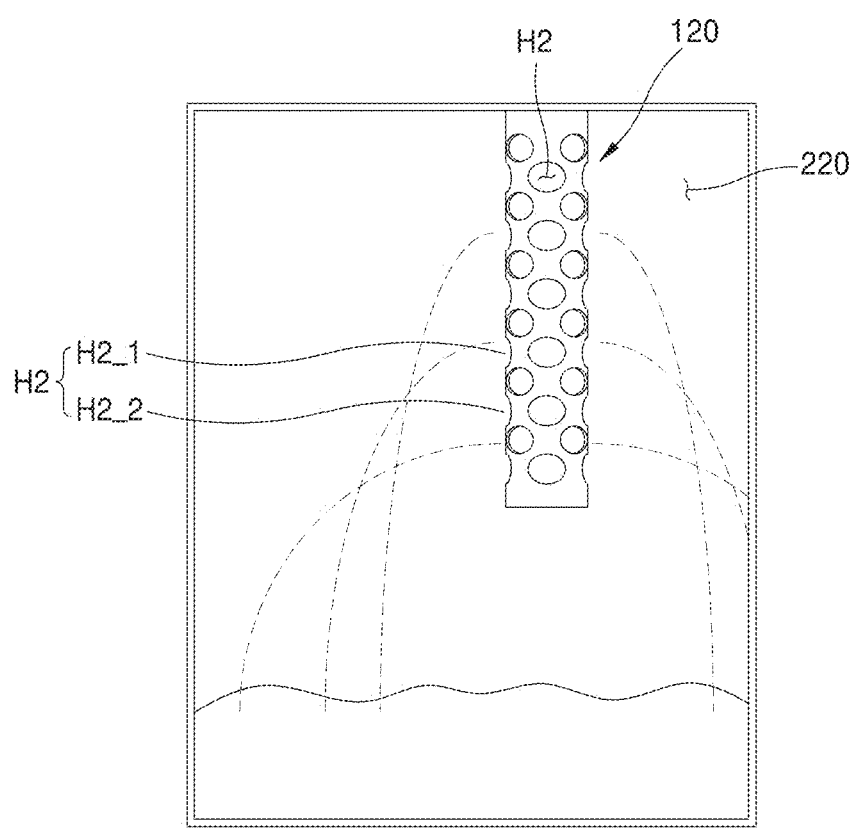
FIG. 6 is a side view of a chemical solution vaporization device according to an example embodiment of the disclosure.
Figure 7:
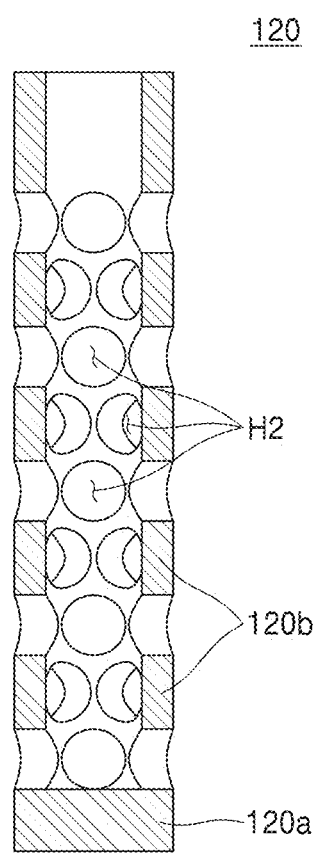
FIG. 7 is an internal cross-sectional view of a chemical solution vaporization device according to an example embodiment of the disclosure.

FIG. 6 is a side view of a chemical solution supply unit 120 according to an example embodiment of the disclosure, and FIG. 7 is an internal cross-sectional view of the chemical solution supply unit 120 according to an example embodiment of the disclosure.

The chemical solution supply unit 120 according to a comparative example may include a general tube that includes a chemical solution discharge hole formed at a lower portion thereof. The chemical solution supply unit 120 according to the comparative example may spray the chemical solution in a vertical direction (for example, a direction perpendicular to the surface of the chemical solution in the chemical solution supply room 220 to the chemical solution supply room 220.

The chemical solution sprayed from the chemical solution supply unit 120 according to the comparative example may splash from the surface of the chemical solution stored in the chemical solution supply room 220. In addition, a drop area of the chemical solution sprayed from the chemical solution supply unit 120 may be concentrated at one point, and the chemical solution sprayed from the chemical solution supply unit 120 may increase the intensity of vibration of the chemical solution in the chemical solution supply room 220.

Referring to FIGS. 6 and 7 together, the chemical solution supply unit 120 according to example embodiments of the disclosure may have a plurality of chemical solution discharge holes H2 having different heights from each other on a side surface 120b thereof. In an example embodiment, the chemical solution supply unit 120 may include a tube including a lower surface 120a blocking the flow of the chemical solution, and the side surface 120b including the plurality of chemical solution discharge holes H2 having different heights from each other.

In an example embodiment, because the chemical solution supply unit 120 may include the plurality of chemical solution discharge holes H2 on the side thereof, the chemical solution supply unit 120 may spray the chemical solution in a horizontal direction (for example, in a direction horizontal to the surface of the chemical solution in the chemical solution supply room 220).

In addition, because the side of the chemical solution supply unit 120 includes the plurality of chemical solution discharge holes H2 having different heights from each other, the dropping area of the chemical solution sprayed from the chemical solution supply unit 120 may not be concentrated at one point, and may be dispersed.

In an example embodiment, the chemical solution supply unit 120 may have a first chemical solution discharge hole H2_1 and a second chemical solution discharge hole H2_2 on side surfaces thereof. The first chemical solution discharge hole H2_1 may be above the second chemical solution discharge hole H2_2. In other words, a height of the first chemical solution discharge hole H2_1 may be greater than that of the second chemical solution discharge hole H2_2.

In an example embodiment, the chemical solution sprayed from the first chemical solution discharge hole H2_1 may fall to a first falling area of the surface of the chemical solution stored in the chemical solution supply room 220 and the chemical solution sprayed from the second chemical solution discharge hole H2_2 may fall to a second falling area outside the first falling area of the surface of the chemical solution stored in the chemical solution supply room 220. Accordingly, the falling area of the chemical solution sprayed from the chemical solution supply unit 120 may be dispersed without being concentrated at one point, and the intensity of vibration of the chemical solution in the chemical solution supply room 220 may be reduced.

In an example embodiment, an area occupied by the plurality of chemical solution discharge holes H2 among the area of the side surface 120b of the chemical solution supply device 120 may be about 20% to about 80%. For example, the area occupied by the plurality of chemical solution discharge holes H2 among the area of the side surface 120b of the chemical solution supply device 120 may be about 40%. However, the area occupied by the plurality of chemical solution discharge holes H2 among the area of the side surface 120b of the chemical solution supply device 120 is not limited the above-described numerical values.

In an example embodiment, a lower wall of the chemical solution supply unit 120 may have a circular shape having a diameter of about 5 mm to about 10 mm. In addition, a side surface of the chemical solution supply unit 120 may extend in a vertical direction from the lower wall, and may have a height of about 50 millimeters to about 70 millimeters. Accordingly, the chemical solution supply unit 120 may include a cylindrical tube. However, the structure of the chemical solution supply unit 120 is not limited thereto.

In an example embodiment, the plurality of chemical solution discharge holes H2 may be arranged in a zig-zag or honeycomb shape on the side surface of the chemical solution supply unit 120 to have different heights. For example, the plurality of chemical solution discharge holes H2 may have a circular shape having a diameter of about 3 millimeters to about 5 millimeters, and may be in a zig-zag or honeycomb shape on the side surface of the chemical solution supply unit 120.

Figure 8:
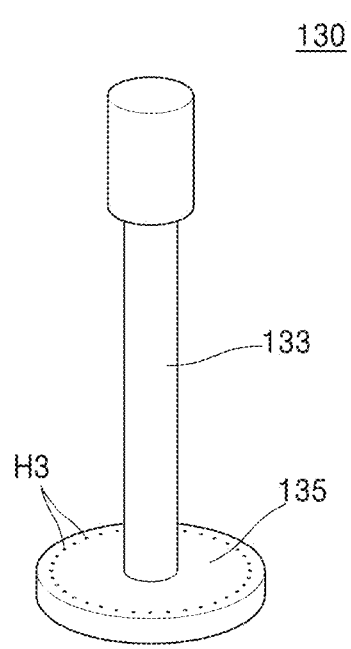
FIG. 8 is a diagram three-dimensionally illustrating a bubbler according to an embodiment of the disclosure.

FIG. 8 is a diagram three-dimensionally illustrating the bubbler 130 according to an embodiment of the disclosure. As described above, the bubbler 130 may include the vaporization gas injector 133 having a flow path through which the vaporization gas is injected and the vaporization gas discharger 135 that is coupled with the vaporization gas injector 133 and discharges the vaporization gas into the chemical solution.

In an example embodiment, the vaporizing gas injector 133 may include a cylindrical tube. In addition, the vaporization gas injector 133 may have a cylindrical shape having a diameter of about 5 mm to about 10 mm. For example, the vaporization gas injector 133 may have a cylindrical shape having a diameter of about 9 mm. However, the structure of the vaporization gas injector 133 is not limited to the above-described numerical values.

In addition, the vaporization gas discharger 135 may be connected to a lower portion of the vaporization gas injector 133, and may have a cylindrical shape having a cross-section area that is greater than that of the vaporization gas injector 133. For example, the vaporization gas discharger 135 may have a cylindrical shape having a diameter of about 50 mm to about 70 mm. For example, the vaporization gas injector 133 may have a cylindrical shape having a diameter of about 65 millimeters. However, the structure of the vaporization gas injector 133 is not limited to the above-described numerical values.

In an example embodiment, the vaporization gas discharger 135 may include a plurality of vaporization gas discharge holes H3 in the upper surface thereof. The vaporization gas discharge holes H3 may be connected to the vaporization gas injector 133, and discharge the vaporization gas in a direction opposite to the direction of gravity into the chemical solution.

Hereinafter, an arrangement and a shape of the vaporization gas discharge holes H3 formed in the upper surface of the vaporization gas discharger 135 will be described in more detail with reference to FIGS. 9 through 14.

Figure 9:
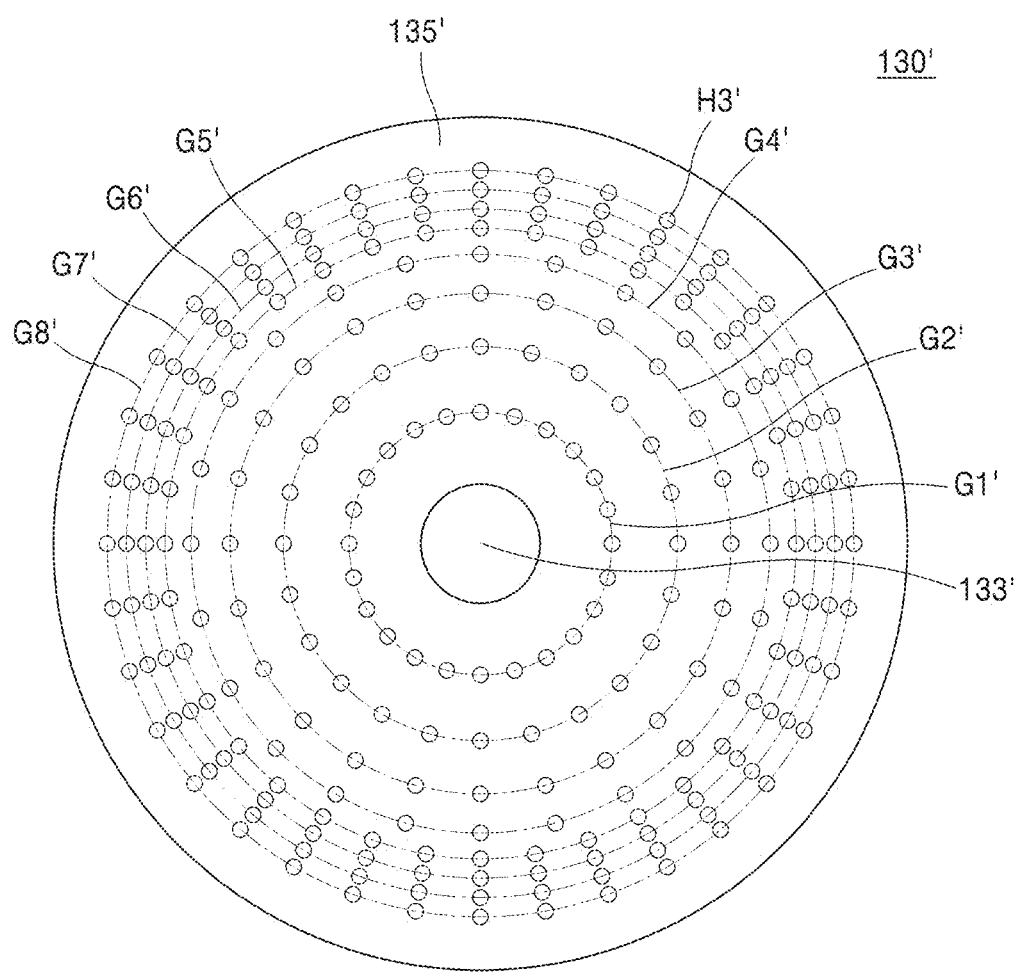
FIG. 9 is a plan view of a bubbler according to a comparative example.
Figure 10:
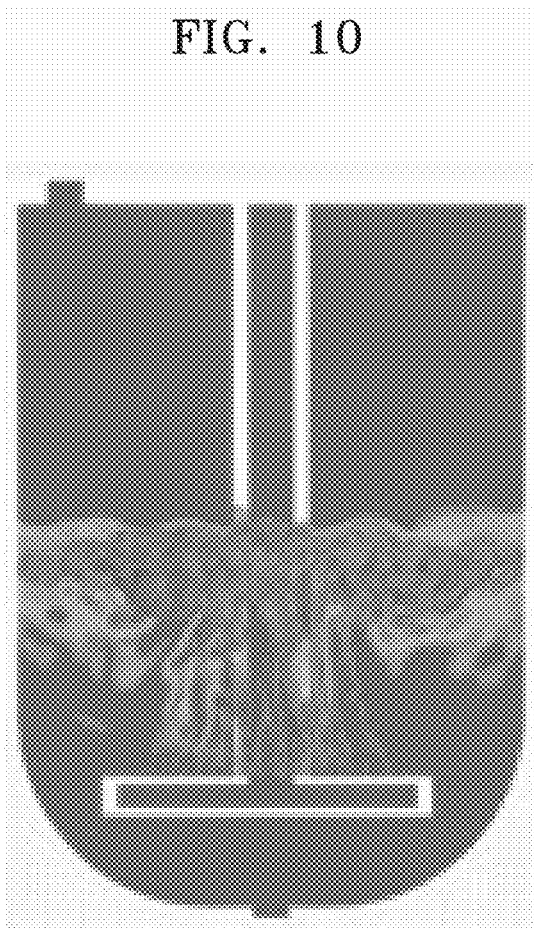
FIG. 10 is a diagram of the inside of a chemical solution vaporization room when a processing gas is generated by using a bubbler, according to a comparative example.

FIG. 9 is a plan view of a bubbler 130' according to a comparative example, and FIG. 10 is a view of the interior of the chemical solution vaporization room 210 when the processing gas is generated by using the bubbler 130', according to the comparative example.

Referring to FIG. 9, the bubbler 130' according to the comparative example may include first through eighth vaporization gas discharge groups G1' through G8' on the upper surface thereof.

The first through eighth vaporization gas discharge groups G1' through G8' may be defined as a group of vaporization gas discharge holes H3' having a certain distance from the center portion of the vaporization gas injector 133'. In other words, the plurality of vaporization gas discharge holes H3' in the first through eighth vaporization gas discharge groups G1' through G8' may be in a radial shape in an upper surface of a vaporization gas injector 135' to have a certain distance from the center portion of the vaporization gas injector 133'.

In an example embodiment, the first vaporization gas discharge group G1' may be defined as a group of vaporization gas discharge holes H3' having a first distance from the center portion of the vaporization gas injector 133' and the second vaporization gas discharge group G2' may be defined as a group of vaporization gas discharge holes H3' having a second distance from the center portion of the vaporization gas injector 133', the second distance being greater than the first distance.

The bubbler 130' according to the comparative example may include the first through eighth vaporization gas discharge groups G1' through G8' in both the central portion and an edge portion of the vaporization gas discharger 135'.

Referring to FIG. 10, when the process gas is generated by using the bubbler 130' according to the comparative example, bubbles of the vaporization gas discharged from the center portion of the bubbler 130' may collide with the side surface of the vaporization gas injector 133. Accordingly, a shape of bubbles of the vaporization gas discharged from the center portion of the bubbler 130' may change irregularly as the bubbles move upward.

In addition, bubbles of the vaporization gas discharged from a portion adjacent to an edge portion of the bubbler 130' may collide with the first internal wall 110c_1 of the chemical solution tank 110. Accordingly, a shape of bubbles of the vaporization gas discharged from the edge portion of the bubbler 130' may change irregularly as the bubbles move upward. Accordingly, the concentration of the vaporization gas generated by the bubbler 130' may be different in each of the first through fourth chemical solution vaporization rooms 210_1 through 210_4.

In addition, when the processing gas is generated by using the bubbler 130' according to the comparative example, the intensity of vibration of the chemical solution in the first through fourth chemical solution vaporization rooms 210_1 through 210_4 may be increased. As the intensity of vibration of the chemical solution increases, there may be a risk that the chemical solution splashes upward and flows into the processing gas valve 160 and a vortex may be formed in a portion adjacent to the surface of the chemical solution.

Figure 11:
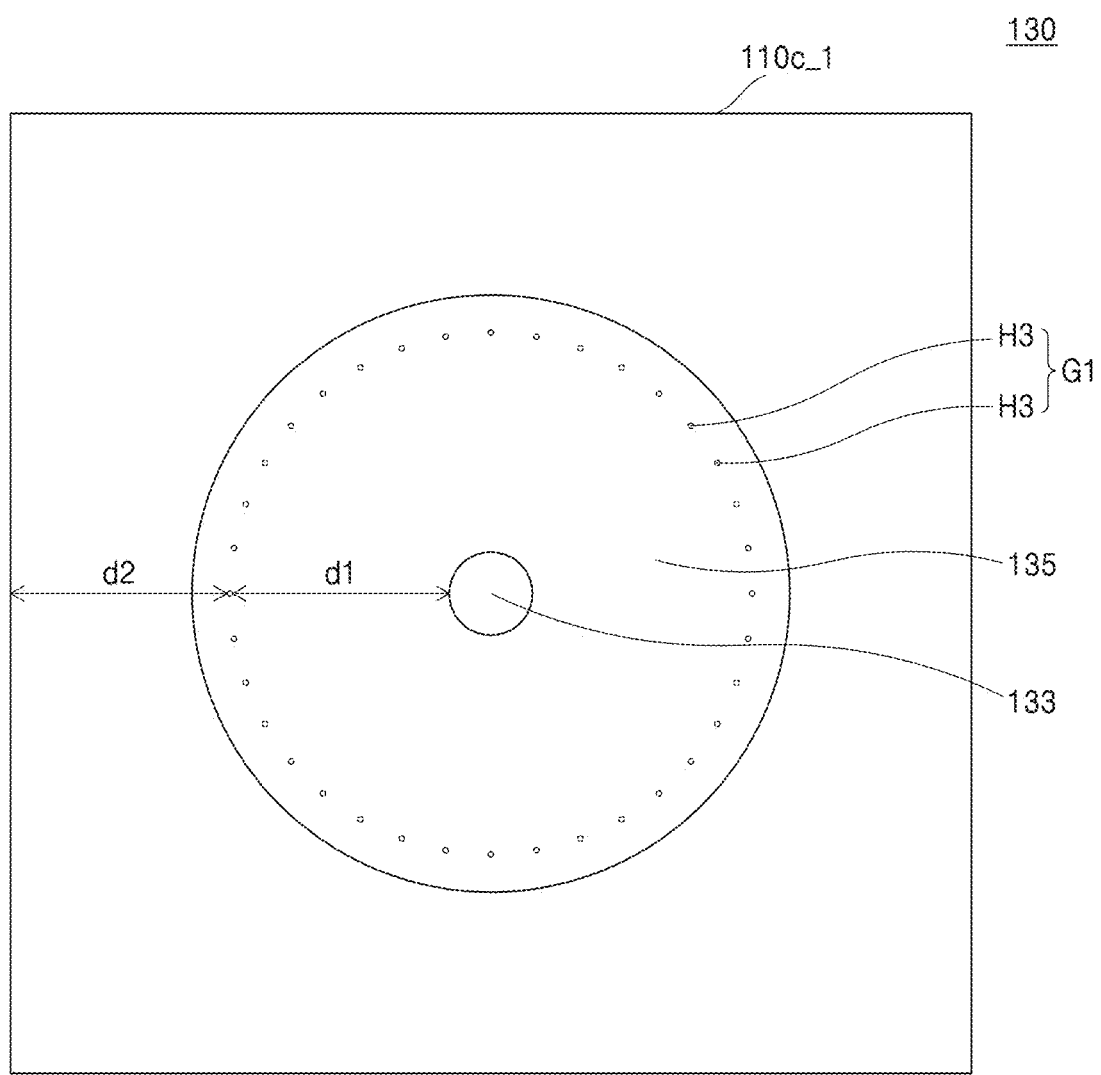
FIG. 11 is a plan view of a bubbler according to an example embodiment of the disclosure.
Figure 12:
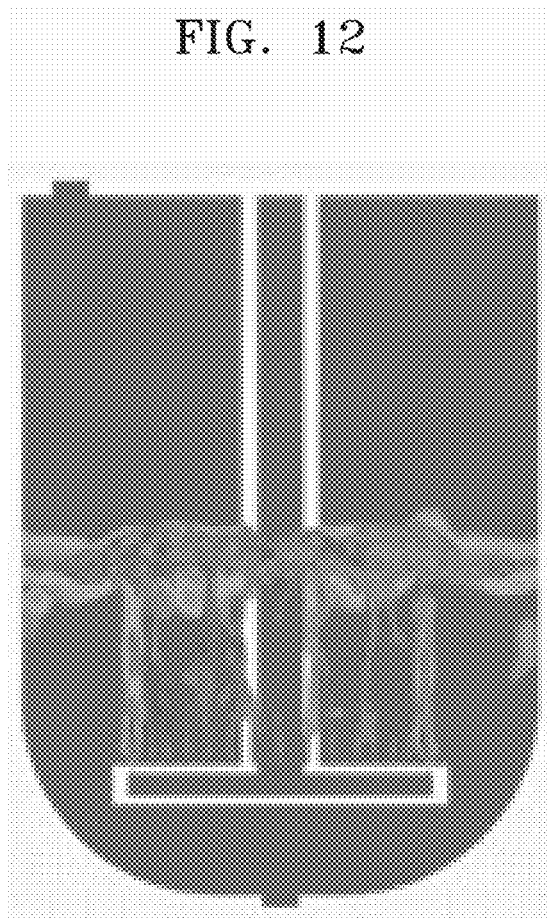
FIG. 12 is a diagram of the inside of a chemical solution vaporization room when a processing gas is generated by using a bubbler, according to an embodiment of the disclosure.

FIG. 11 is a plan view of the bubbler 130 according to an example embodiment of the disclosure, and FIG. 12 is a diagram of the inside of the chemical solution vaporization room 210 when a processing gas is generated by using the bubbler 130 according to an embodiment of the disclosure.

Referring to FIG. 11, the bubbler 130 according to an example embodiment of the disclosure may include only one first vaporization gas discharge group G1 on the upper surface thereof. For example, the vaporization gas discharge holes H3 in the first vaporization gas discharge group G1 may be in a radial shape on the upper surface of the vaporization gas discharger 135 to have a certain distance from the central portion of the vaporization gas injector 133.

In an example embodiment, the first vaporization gas discharge group G1 including the plurality of vaporization gas discharge holes H3 may be formed at the edge of the vaporization gas discharger 135. In other words, the first vaporization gas discharge group G1 may not be at the central portion of the vaporization gas discharger 135, but may be in a radial shape at the edge of the vaporization gas discharger 135.

In an example embodiment, the first vaporization gas discharge group G1 may be at the side surface of the vaporization gas injector 133 and at the central portion of the first internal wall 110c_1. For example, a distance d1 between the gasification gas discharge hole H3 and the side surface of the gasification gas injector 133 may be substantially the same as a distance d2 between the gasification gas discharge hole H3 and the first internal wall 110c_1. (In other words, d1=d2).

Referring to FIG. 12, when the process gas is generated by using the bubbler 130 according to an example embodiment of the disclosure, collision of the bubbles of the vaporization gas discharged from the vaporization gas discharge hole H3 against the side surface of the vaporization gas injector 133 and the first internal wall 110c_1 may be reduced.

Accordingly, a shape of the bubble of the vaporization gas discharged from the vaporization gas discharge hole H3 may be uniform. For example, the shape of the vaporization gas discharged from the vaporization gas discharge hole H3 may be close to a spherical shape. In addition, the concentration of the vaporization gas generated by the bubbler 130 may be uniform in each of the first through fourth chemical solution vaporization rooms 210_1 through 210_4.

When the processing gas is generated by using the bubbler 130 according to an example embodiment of the disclosure, the intensity of vibration on the surface of the chemical solution in the first through fourth chemical solution vaporization rooms 210_1 through 210_4 may be decreased. As the intensity of vibration of the chemical solution in the first through fourth chemical solution vaporization rooms 210_1 through 210_4 decreases, the risk of the chemical solution splashing upward and flowing into the processing gas valve 160 may be reduced and a phenomenon in which a vortex occurs in a portion adjacent to the surface of the chemical solution may be reduced.

Figure 13A:
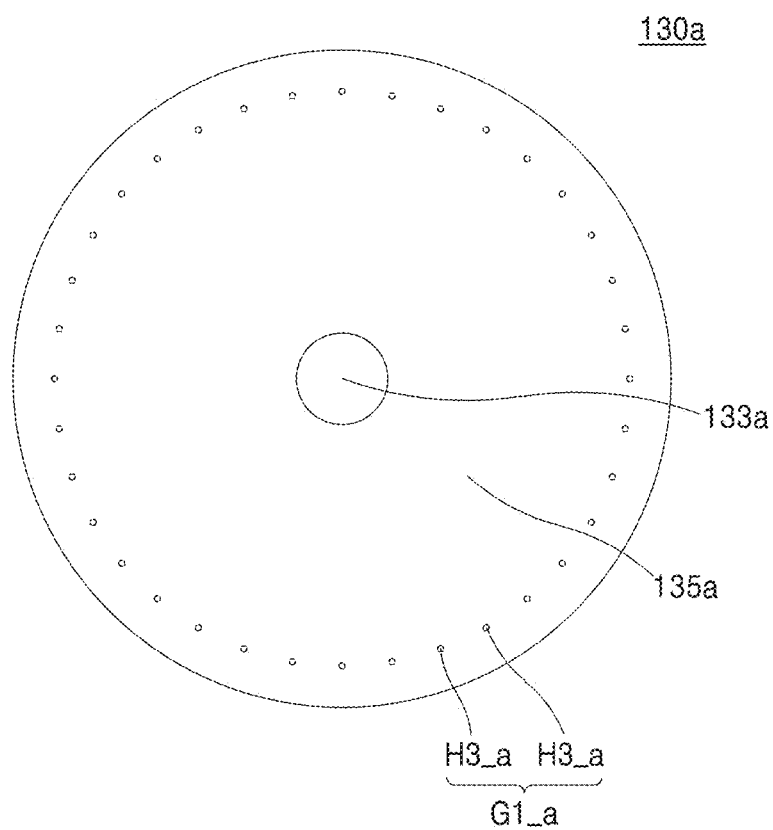
FIGS. 13A and 13B illustrate plan views of bubblers according to example embodiments of the disclosure.
Figure 13B:
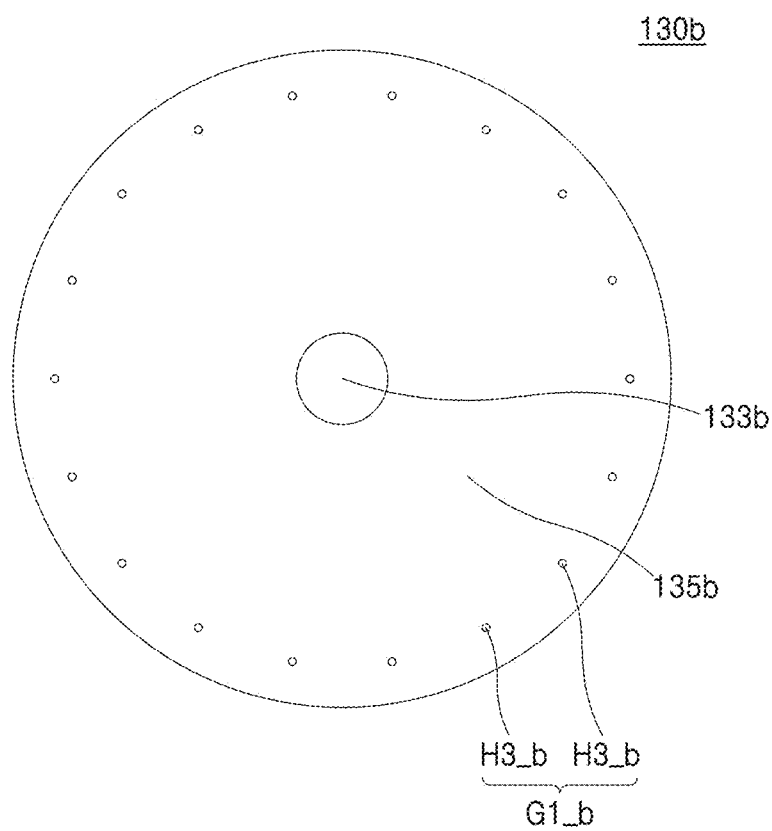

FIGS. 13A and 13B illustrate plan views of first and second bubblers 130a and 130b according to example embodiments of the disclosure.

The bubbler illustrated by FIG. 13A may be the first bubbler 130a, and the bubbler illustrated by FIG. 15B may be the second bubbler 130b. The first bubbler 130a may include a first vaporization gas injector 133a and a first vaporization gas discharger 135a, and the second bubbler 130b may include a second vaporization gas injector 133b and a second vaporization gas discharger 135b.

Referring to FIG. 13A, the first bubbler 130a may include a first vaporization gas discharge group G1_a including a plurality of first vaporization gas discharge holes H3_a. The first vaporization gas discharge group G1_a may be provided at an edge of the first vaporization gas discharger 135a.

In an example embodiment, the first vaporization gas discharge group G1_a may be provided on an upper surface of the first vaporization gas discharger 135a, so that a distance between the first vaporization gas discharge hole H3_a and a side surface of the first vaporization gas injector 133a is substantially the same as that between the first vaporization gas discharge hole H3_a and the first internal wall 110c_1.

In an example embodiment, the first vaporization gas discharge holes H3_a may have an interval of about 10 degrees, and may be in a radial shape. For example, the first vaporization gas discharge group G1_a may have an interval of about 10 degrees and may include 36 first vaporization gas discharge holes H3_a that are radially arranged on the upper surface of the first vaporization gas discharger 135a.

Referring to FIG. 13B, the second bubbler 130b may include a second vaporization gas discharge group G1_b including a plurality of second vaporization gas discharge holes H3_b and the second vaporization gas discharge group G1_b may be provided at an edge of the second vaporization gas discharger 135b.

In an example embodiment, the second vaporization gas discharge group G1_b may be provided on an upper surface of the second vaporization gas discharger 135b, so that a distance between the second vaporization gas discharge hole H3_b and a side surface of the second vaporization gas injector 133b is substantially the same as that between the second vaporization gas discharge hole H3_b and the first internal wall 110c_1.

In an example embodiment, the second vaporization gas discharge holes H3_b may have an interval of about 20 degrees, and may be in a radial shape. For example, the second vaporization gas discharge group G1_b may have an interval of about 20 degrees and may include 18 second vaporization gas discharge holes H3_b that are radially arranged in the upper surface of the second vaporization gas discharger 135b.

Figure 14:
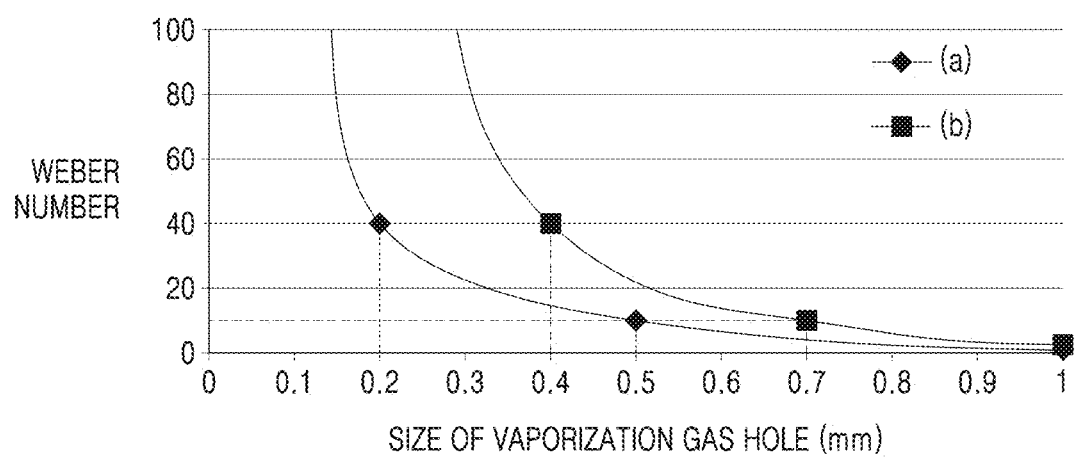
FIG. 14 is a graph of Weber numbers based on sizes of vaporization gas discharge holes of bubblers.

FIG. 14 is a graph of Weber numbers based on sizes of vaporization gas discharge holes of bubblers. A curve (a) in FIG. 14 may be the Weber number curve based on the size of the vaporization gas discharge hole H3_a of the first bubbler 130a in FIG. 13A, and a curve (b) in FIG. 14 may be the Weber number curve based on the size of the vaporization gas discharge hole H3_a of the second bubbler 130b in FIG. 13B.

The Weber number may be a dimensionless number representing the effect of surface tension. The Weber number may be a non-dimensional number indicating a ratio of inertial force over surface tension or a ratio of kinetic energy over surface energy.

In the graph of FIG. 14, when the Weber number is less than about 10, the efficiency of generating the process gas by using the first and second bubblers 130a and 130b may be reduced. For example, due to a decrease in a rate of discharge of bubbles of the vaporization gas, the generation efficiency of the processing gas may be reduced. In addition, because the shape of the bubble of the vaporization gas is not uniform, the concentration of the processing gas generated in the first through fourth chemical solution vaporization rooms 210_1 through 210_4 may be different.

In addition, when the Weber number is greater than about 40, due to a rapid increase in the discharge rate of the bubble of the vaporization gas of the first and second bubblers 130a and 130b, there may occur an issue that the chemical solution stored in the first through fourth chemical solution vaporization rooms 210_1 through 210_4 splashes.

To solve the above-described issue, the size of the first vaporization gas discharge holes H3_a of the first bubbler 130a and the size of the second vaporization gas discharge holes H3_b of the second bubbler 130b according to an example embodiment of the disclosure may be determined to be in a range in which the Weber number is about 10 to about 40.

Referring to the curve (a) of FIG. 14, when the Webber constant is in the range of about 10 to about 40, the size of the first vaporization gas discharge holes H3_a may be determined to be about 0.20 mm to about 0.50 mm. In an example embodiment, the first vaporization gas discharge holes H3_a may have a circular shape having a diameter of about 0.20 mm to about 0.50 mm. For example, the first vaporization gas discharge hole H3_a may have a circular shape having a diameter of about 0.30 mm.

When the diameter of the first vaporization gas discharge holes H3_a is less than about 0.20 mm, the process of forming the first vaporization gas discharge holes H3_a on the first bubbler 130a may not be easy, and an issue may occur in which the chemical solution splashes due to an excessive discharge rate of the vaporization gas.

When the diameters of the first vaporization gas discharge holes H3_a exceed about 0.50 mm, the shape of the bubble of the vaporization gas discharged from the first vaporization gas discharge holes H3_a may not be uniform. Accordingly, the concentration of the processing gas generated in the first through fourth chemical solution vaporization rooms 210_1 through 210_4 may be different.

Because the first bubbler 130a according to the example embodiment of the disclosure may have the first vaporization gas discharge holes H3_a having the diameter of about 0.20 mm to about 0.50 mm at the edge portion thereof, the first bubbler 130a may increase the generation efficiency of the processing gas and prevent a phenomenon that the chemical solution splashes.

Referring to the curve (b) of FIG. 14, when the Webber constant is in the range of about 10 to about 40, the size of the first vaporization gas discharge holes H3_b may be determined to be about 0.40 mm to about 0.70 mm.

In an example embodiment, the second vaporization gas discharge holes H3_b may have a circular shape having a diameter of about 0.40 mm to about 0.70 mm. For example, the second vaporization gas discharge hole H3_b may have a circular shape having a diameter of about 0.50 mm.

When the diameter of the second vaporization gas discharge holes H3_b is less than about 0.40 mm, an issue may occur in which the chemical solution splashes due to an excessive discharge rate of the vaporization gas. In addition, when the diameter of the second vaporization gas discharge holes H3_b exceeds about 0.70 mm, the shape of the bubble of the vaporization gas discharged from the second vaporization gas discharge holes H3_b may not be uniform. Accordingly, the concentration of the processing gas generated in the first through fourth chemical solution vaporization rooms 210_1 through 210_4 may be different.

Because the second bubbler 130b according to the example embodiment of the disclosure may have the second vaporization gas discharge holes H3_b having the diameter of about 0.40 mm to about 0.70 mm at the edge portion thereof, the second bubbler 130b may increase the generation efficiency of the processing gas and prevent the phenomenon that the chemical solution splashes.

Figure 15:
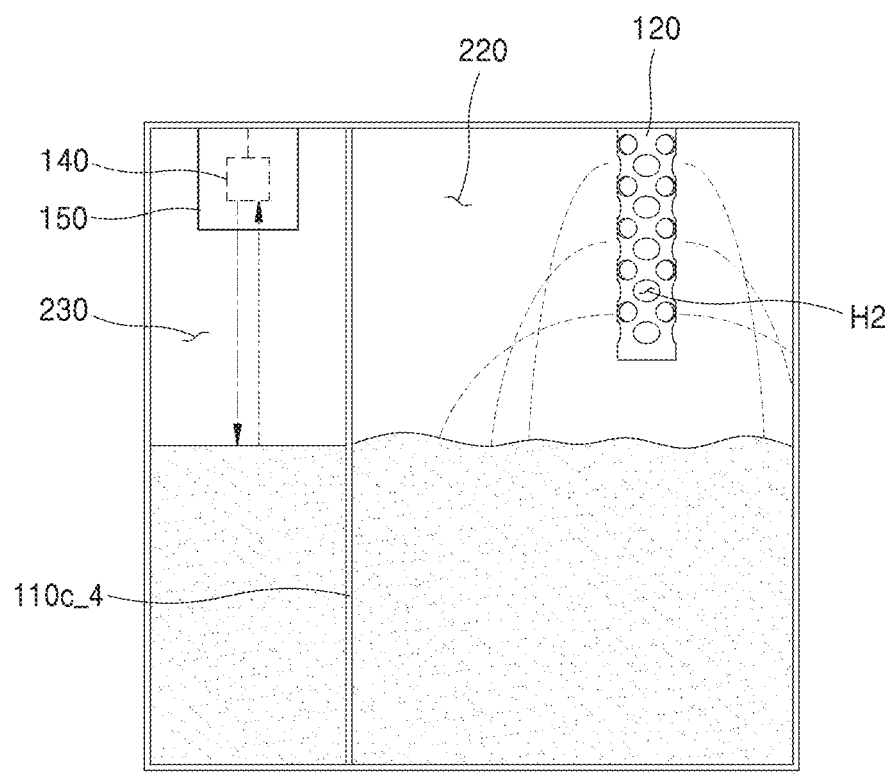
FIG. 15 is a diagram of a level sensor according to an embodiment of the disclosure.

FIG. 15 is a diagram of the level sensor 140 according to an embodiment of the disclosure.

Referring to FIG. 15, the level sensor 140 may be in the chemical solution sensing room 230 of the chemical solution tank 110 and measure the level of the chemical solution in the chemical solution sensing room 230. In other words, the level sensor 140 may measure a height that is formed in a vertical direction from the lower wall of the chemical solution tank 110 by the chemical solution in the chemical solution sensing room 230.

The level sensor 140 may be vertically apart from the chemical solution in the chemical solution sensing room 230 and may include a contactless sensor configured to measure the level of the chemical solution without physical contact with the chemical solution. Accordingly, the level sensor 140 may not be contaminated by the chemical solution in the chemical solution sensing room 230.

In an example embodiment, the level sensor 140 may include an ultrasonic sensor installed to be apart from the chemical solution in a vertical direction. For example, the level sensor 140 may measure the level of the chemical solution by radiating ultrasonic waves onto the surface of the chemical solution and then measuring the time until receiving the reflected ultrasonic waves from the surface of the chemical solution.

In an example embodiment, the fourth internal wall 110c_4 between the chemical solution supply room 220 and the chemical solution sensing room 230 may block a direct flow of the chemical solution from the chemical solution supply room 220 to the chemical solution sensing room 230. Accordingly, the intensity of vibration of the chemical solution in the chemical solution sensing room 230 may be reduced and the level sensor 140 may accurately measure the level of the chemical solution.

In addition, the chemical solution supply unit 120 may include the plurality of chemical solution discharge holes H2 having different heights from each other and spray the chemical solution in a direction horizontal to the surface of the chemical solution via the chemical solution discharge holes H2. Because the chemical solution supply unit 120 reduces the intensity of vibration on the surface of the chemical solution in the chemical solution supply room 220, the intensity of vibration of the chemical solution transferred from the chemical solution supply room 220 to the chemical solution sensing room 230 may be reduced. Accordingly, the level sensor 140 may accurately measure the level of the chemical solution.

In an example embodiment, when the level of the chemical solution measured by the level sensor 140 does not reach a reference level, the level sensor 140 may transmit a first signal to a controller (not illustrated). When the controller receives the first signal, the controller may control the chemical solution supply unit 120 to supply the chemical solution to the chemical solution supply room 220.

In addition, when the level of the chemical solution measured by the level sensor 140 exceeds the reference level, the level sensor 140 may transmit a second signal to the controller. When the controller receives the second signal, the controller may control the chemical solution supply unit 120 to stop supplying the chemical solution to the chemical solution supply room 220.

In an example embodiment, the sensor input tube 150 may be coupled with the tank cover 115, and may provide a path via which the level sensor 140 moves. In addition, the sensor input tube 150 may surround the level sensor 140. Because the sensor input tube 150 may surround the level sensor 140, contamination of the level sensor 140 due to splashing of the chemical solution may be prevented.

Figure 17:
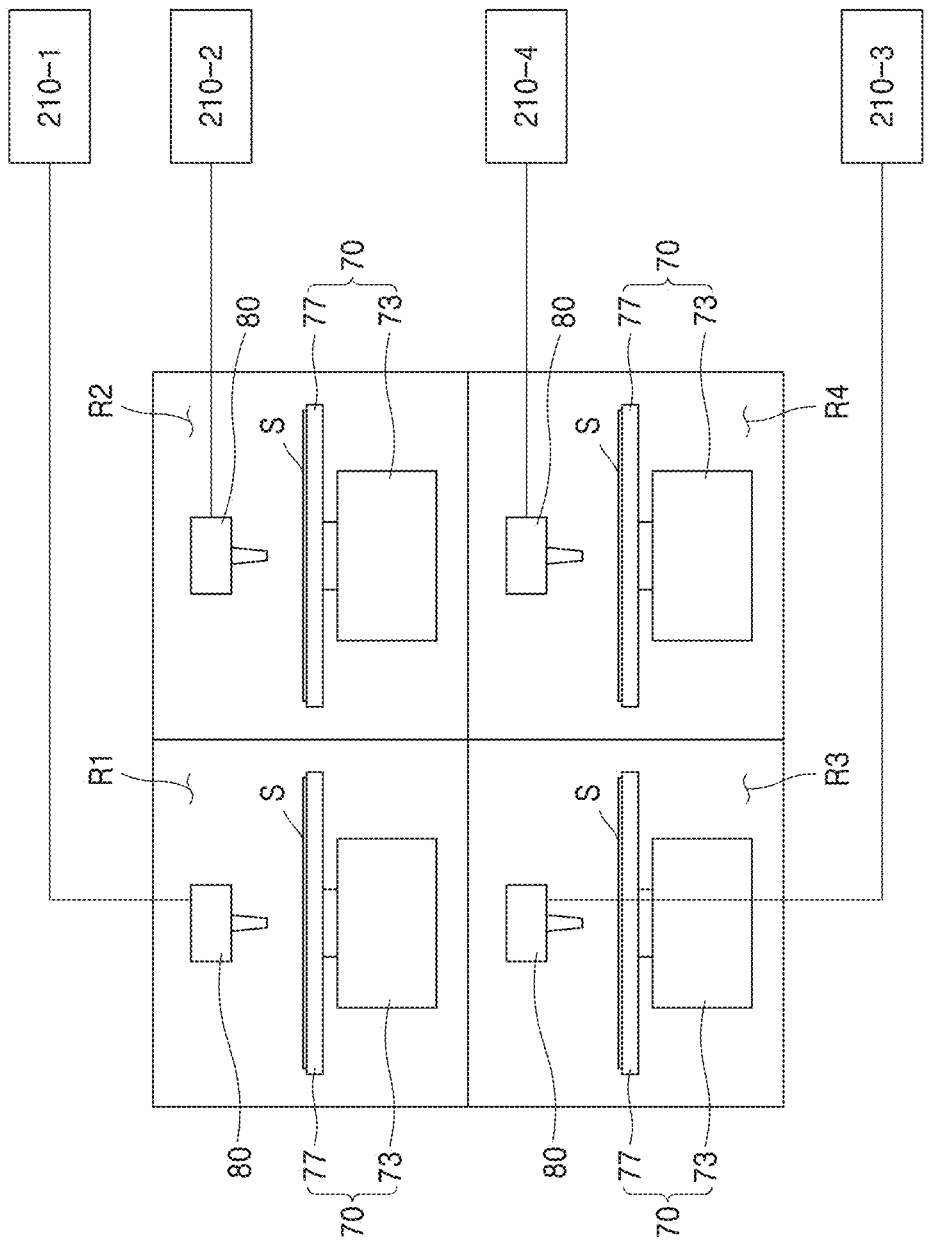

FIGS. 16 and 17 are diagrams of a chemical solution vaporization device 10 and a substrate processing device 1, according to example embodiments of the disclosure.

Referring to FIGS. 16 and 17 together, the substrate processing device 1 may include a device that receives the processing gas generated by the vaporization device 10 and sprays the processing gas onto a substrate S to perform the hydrophobic treatment.

The substrate processing device 1 may include the first through fourth reactors R1 through R4. The first through fourth reactors R1 through R4 may provide a space in which a process of applying the process gas to the substrate S is performed.

Each of the first through fourth reactors R1 through R4 may include a spin chuck 70 on which the substrate S is seated therein and a processing gas coating device 80 supplying the processing gas onto the surface of the substrate S.

It may be required that the processing gas generated in the first through fourth chemical solution vaporization rooms 210_1 through 210_4 of the chemical solution vaporization device 10 is supplied at a uniform concentration to the first through fourth reactors R1 through R4, respectively, and then is applied on the substrate S at a uniform concentration.

When the processing gas is applied at a uniform concentration on the surface of the substrate S, a photoresist material may be applied to the substrates S with a certain thickness. Accordingly, the performance of the semiconductor devices generated by the substrates S may be uniform.

The chemical solution vaporization device 10 of the substrate processing device 1 according to the example embodiment of the disclosure may include the first through fourth chemical vaporization rooms 210_1 through 210_4, and the first through fourth chemical vaporization rooms 210_1 through 210_4 may be connected to the first through fourth reactors R1 through R4, respectively.

As described above, the levels of the chemical solution stored in the first through fourth chemical solution vaporization rooms 210_1 through 210_4 according to an example embodiment of the disclosure may be substantially the same and the dimensions of the first through fourth chemical solution vaporization rooms 210_1 through 210_4 may be substantially the same.

Accordingly, the concentration of the processing gas generated in the first through fourth chemical solution vaporization rooms 210_1 through 210_4 may be uniform and the chemical solution vaporization device 10 may deliver the processing gas at a uniform concentration to the first through fourth reactors R1 through R4.

The spin chuck 70 of the substrate processing device 1 may include a body 73 and a rotation plate 77 rotating about a central axis of the body 73. An upper surface of the rotating plate 77 may be a surface on which the substrate S is seated.

In an example embodiment, the substrate S seated on the spin chuck 70 may include a wafer. However, the embodiment is not limited to the above description and the substrate S may include a printed circuit board (PCB).

A processing gas coating device 80 of the substrate processing device 1 may be above the spin chuck 70 and may include a device applying the processing gas onto the surface of the substrate S. In an example embodiment, the processing gas coating device 80 may supply the processing gas onto the surface of the substrate S after receiving the processing gas from the chemical solution vaporization device 10.

In an example embodiment, in a state in which the spin chuck 70 on which the substrate S is mounted rotates, the processing gas coating device 80 may supply the processing gas onto the surface of the substrate S. By the rotation of the spin chuck 70, the processing gas may be uniformly applied onto the surface of the substrate S.

The chemical solution vaporization device 10 according to an example embodiment of the disclosure may include the first through fourth chemical vaporization rooms 210_1 through 210_4 having substantially the same dimensions, and the levels of the chemical solution in the first through fourth chemical vaporization rooms 210_1 through 210_4 may be substantially the same.

Accordingly, the concentration of the processing gas delivered from the first through fourth chemical vaporization rooms 210_1 through 210_4 to the first through fourth reactors R1 through R4 may be uniform. Therefore, the substrate processing device 10 of the disclosure may apply the processing gas having a uniform concentration onto the surface of the substrate S.

In an example embodiment, a chemical solution vaporization device comprises a chemical solution supply compartment; a chemical solution level-sensing compartment disposed adjacent to the chemical solution supply compartment; and a first chemical solution vaporization compartment, wherein: a first separation wall separates the chemical solution supply compartment from the chemical solution level-sensing compartment to preclude a direct flow of chemical solution from the chemical solution supply compartment to the chemical solution level-sensing compartment, a second separation wall separates the chemical solution supply compartment from the first chemical solution vaporization compartment to preclude a direct flow of a chemical solution from the chemical solution supply compartment to the first chemical solution vaporization compartment except through a first orifice in the second separation wall, and the chemical solution level-sensing compartment receives the chemical solution indirectly from the chemical solution supply compartment through a flow path traversing the first chemical solution vaporization compartment.

Accordingly, the chemical solution vaporization device further comprises a second chemical solution vaporization compartment; and a third separation wall separating the chemical solution level-sensing compartment from the second chemical solution vaporization compartment to preclude a direct flow of the chemical solution from the second chemical solution vaporization compartment to the chemical solution level-sensing compartment except through a second orifice in the third separation wall, wherein the flow path also traverses the second chemical solution vaporization compartment.

Accordingly, the chemical solution vaporization device further comprises a fourth separation wall separating the first chemical solution vaporization compartment from the second chemical solution vaporization compartment to preclude a direct flow of the chemical solution from the first chemical solution vaporization compartment to the second chemical solution vaporization compartment except through a third orifice in the fourth separation wall.

Accordingly, the third orifice has a larger surface area than each of the first orifice and the second orifice.

Accordingly, the chemical solution vaporization device further comprises a vaporization gas discharger disposed within the first chemical solution vaporization compartment that injects a vaporization gas into the chemical solution that is disposed in the first chemical solution vaporization compartment.

Accordingly, each of the first orifice and the third orifice is disposed at a height intermediate between a bottom inner surface for containing the chemical solution within the chemical solution vaporization device and the vaporization gas discharger.

Accordingly, the vaporization gas discharger injects the vaporization gas into the chemical solution through a singular group of injection orifices disposed at a same radius with respect to a central point of the vaporization gas discharger.

While the disclosure has been particularly shown and described with reference to embodiments thereof, it will be understood that various changes in form and details may be made therein without departing from the spirit and scope of the following claims.

What is claimed is:

1. A chemical solution vaporization device comprising:
   a chemical solution tank comprising a lower wall, first through fourth internal walls, an external wall defining a plurality of chemical solution vaporization rooms, a chemical solution sensing room, and a chemical solution supply room and configured to store a chemical solution, wherein:
      the first internal wall is configured to separate the plurality of chemical solution vaporization rooms from each other and comprises a first opening at a lower portion thereof,
      the second internal wall is configured to separate at least one of the plurality of chemical solution vaporization rooms from the chemical solution supply room and comprises a second opening at a lower portion thereof,
      the third internal wall is configured to separate at least one of the plurality of chemical solution vaporization rooms from the chemical solution sensing room and comprises a third opening at a lower portion thereof, and
      a lower portion of the fourth internal wall is configured to separate the chemical solution sensing room from the chemical solution supply room and is combined with the lower wall;
   a chemical solution supply unit configured to supply the chemical solution to the chemical solution supply room;
   a bubbler configured to supply a vaporization gas for vaporizing the chemical solution into the chemical solution stored in the plurality of chemical solution vaporization rooms; and
   a level sensor in the chemical solution sensing room and configured to sense a level of the chemical solution.

2. The chemical solution vaporization device of claim 1, wherein:
the first opening comprises a gap between the first internal wall and the lower wall,
the second opening comprises a gap between the second internal wall and the lower wall, and
the third opening comprises a gap between the third internal wall and the lower wall.

3. The chemical solution vaporization device of claim 2, wherein a separation distance between the first internal wall and the lower wall in a vertical direction is greater than:
a separation distance between the second internal wall and the lower wall in the vertical direction, and
a separation distance between the third internal wall and the lower wall in the vertical direction.

4. The chemical solution vaporization device of claim 1, wherein the chemical solution tank has a cuboid shape.

5. The chemical solution vaporization device of claim 1, wherein the level sensor comprises an ultrasonic sensor apart from a surface of the chemical solution in the chemical solution sensing room in a vertical direction.

6. The chemical solution vaporization device of claim 1, wherein the chemical solution supply unit comprises:
a lower surface configured to block a flow of the chemical solution in a vertical direction, and
a side surface, comprising a plurality of chemical solution discharge holes of different heights from each other, that sprays the chemical solution in a direction horizontal to a surface of the chemical solution in the chemical solution supply room via the plurality of chemical solution discharge holes.

7. The chemical solution vaporization device of claim 6, wherein an area occupied by the plurality of chemical solution discharge holes among an area of a side surface of the chemical solution supply unit is about 20% to about 80%.

8. The chemical solution vaporization device of claim 1, wherein the bubbler comprises:
a vaporization gas injector configured to provide a path through which the vaporization gas moves; and
a vaporization gas discharger connected to a lower portion of the vaporization gas injector and having a cross-sectional area greater than that of the vaporization gas injector, the vaporization gas discharger configured to discharge the vaporization gas into the chemical solution, wherein
the vaporization gas discharger comprises a plurality of vaporization gas discharge holes in a radial shape having a constant distance from a center of the vaporization gas discharger on an upper surface thereof.

9. The chemical solution vaporization device of claim 8, wherein a distance between each of the vaporization gas discharge holes and a side surface of the vaporization gas injector is identical to a distance between the vaporization gas discharge hole and the first internal wall.

10. A chemical solution vaporization device comprising:
a chemical solution tank comprising a plurality of chemical solution vaporization rooms, a chemical solution sensing room, and a chemical solution supply room;
a chemical solution supply unit configured to supply a chemical solution to the chemical solution supply room;
a bubbler configured to supply a vaporization gas into the chemical solution stored in the plurality of chemical solution vaporization rooms, the bubbler comprising:
a vaporization gas injector providing a path in which the vaporization gas moves; and
a vaporization gas discharger comprising a vaporization gas discharge group comprising a plurality of vaporization gas discharge holes in a radial shape having a constant distance from a center portion of the vaporization gas injector on an upper surface thereof, the vaporization gas discharger configured to discharge the vaporization gas into the chemical solution; and
a level sensor in the chemical solution sensing room and configured to sense a level of the chemical solution.

11. The chemical solution vaporization device of claim 10, wherein:
the vaporization gas discharger comprises no other vaporization gas discharge group than the vaporization gas discharge group, and
the vaporization gas discharge group is on an upper surface of the vaporization gas discharger so that a distance between each of the vaporization gas discharge holes and a side surface of the vaporization gas injector is identical to a distance between the vaporization gas discharge hole and the first internal wall.

12. The chemical solution vaporization device of claim 11, wherein:
the plurality of vaporization gas discharge holes is 36 at an interval of about 10 degrees, and
each of the plurality of vaporization gas discharge holes has a circular shape with a diameter of about 0.20 mm to about 0.50 mm.

13. The chemical solution vaporization device of claim 11, wherein:
the plurality of vaporization gas discharge holes is 18 at an interval of about 20 degrees, and
each of the plurality of vaporization gas discharge holes has a circular shape with a diameter of about 0.40 mm to about 0.70 mm.

14. The chemical solution vaporization device of claim 10, wherein:
the chemical solution tank comprises a lower wall, first through fourth internal walls, and an external wall defining the plurality of chemical solution vaporization rooms, the chemical solution sensing room, and the chemical solution supply room,
the first internal wall is configured to separate the plurality of chemical solution vaporization rooms from each other and has a first opening at a lower portion thereof,
the second internal wall is configured to separate at least one of the plurality of chemical solution vaporization rooms from the chemical solution supply room and has a second opening at a lower portion thereof,
the third internal wall is configured to separate at least one of the plurality of chemical solution vaporization rooms from the chemical solution sensing room and has a third opening at a lower portion thereof, and
a lower portion of the fourth internal wall separates the chemical solution sensing room from the chemical solution supply room and is coupled with the lower wall.

15. The chemical solution vaporization device of claim 10, wherein the chemical solution supply unit comprises:
a lower surface configured to block a flow of the chemical solution in a vertical direction; and
a side surface, comprising a plurality of chemical solution discharge holes of different heights from each other, that sprays the chemical solution in a direction horizontal to a surface of the chemical solution in the chemical solution supply room via the plurality of chemical solution discharge holes.

16. The chemical solution vaporization device of claim 10 wherein the level sensor comprises an ultrasonic sensor.

17. A substrate processing device comprising:
a spin chuck configured to rotate a substrate;
a chemical solution vaporization device configured to generate a processing gas by vaporizing a chemical solution, the chemical solution vaporization device comprising:
a chemical solution tank comprising a lower wall, first through fourth internal walls, and an external wall defining a plurality of chemical solution vaporization rooms, a chemical solution sensing room, and a chemical solution supply room, wherein:
the first internal wall is configured to separate the plurality of chemical solution vaporization rooms from each other and comprises a first opening at a lower portion thereof,
the second internal wall is configured to separate at least one of the plurality of chemical solution vaporization rooms from the chemical solution supply room and comprises a second opening at a lower portion thereof,
the third internal wall is configured to separate at least one of the plurality of chemical solution vaporization rooms from the chemical solution sensing room and comprises a third opening at a lower portion thereof, and
a lower portion of the fourth internal wall is configured to separate the chemical solution sensing room from the chemical solution supply room and is coupled with the lower wall;
a chemical solution supply unit configured to supply the chemical solution to the chemical solution supply room;
a bubbler configured to supply a vaporization gas for vaporizing the chemical solution into the chemical solution stored in the plurality of chemical solution vaporization rooms; and
a level sensor in the chemical solution sensing room, the level sensor configured to sense a level of the chemical solution; and
a processing gas coating device configured to apply the processing gas delivered from the chemical solution vaporization device onto the substrate.

18. The substrate processing device of claim 17, wherein the bubbler comprises:
a vaporization gas injector configured to provide a path through which the vaporization gas moves; and
a vaporization gas discharger connected to a lower portion of the vaporization gas injector, the vaporization gas discharger comprising a vaporization gas discharge group comprising a plurality of vaporization gas discharge holes in a radial shape to have a constant distance from a center portion of the vaporization gas injector on an upper surface thereof, wherein
a distance between the vaporization gas discharge hole and a side surface of the vaporization gas injector is identical to a distance between the vaporization gas discharge hole and the first internal wall.

19. The substrate processing device of claim 17, wherein the chemical solution supply unit comprises:
a lower surface configured to block a flow of the chemical solution in a vertical direction; and
a side surface, comprising a plurality of chemical solution discharge holes of different heights from each other, that sprays the chemical solution in a direction horizontal to a surface of the chemical solution in the chemical solution supply room via the plurality of chemical solution discharge holes.

20. The substrate processing device of claim 17, wherein:
the chemical solution supplied by the chemical solution supply unit comprises hexamethyldisilazane in a liquid state, and
the vaporization gas supplied by the bubbler comprises nitrogen in a gaseous state.

* * * * *